(12) United States Patent
Bodin et al.

(10) Patent No.: US 12,344,308 B2
(45) Date of Patent: Jul. 1, 2025

(54) VEHICLE STRUCTURE

(71) Applicant: AUTOTECH ENGINEERING S.L., Bizkaia (ES)

(72) Inventors: Hans Bodin, Södra Sunderbyn (SE); Stefan Arvidsson, Piteå (SE); Robert Viklund, Luleå (SE); Sergi Marquez Duran, Barcelona (ES)

(73) Assignee: AUTOTECH ENGINEERING S.L., Bizkaia (ES)

( * ) Notice: Subject to any disclaimer, the term of this patent is extended or adjusted under 35 U.S.C. 154(b) by 351 days.

(21) Appl. No.: 17/926,738

(22) PCT Filed: Apr. 7, 2021

(86) PCT No.: PCT/EP2021/059051
§ 371 (c)(1),
(2) Date: Nov. 21, 2022

(87) PCT Pub. No.: WO2021/244792
PCT Pub. Date: Dec. 9, 2021

(65) Prior Publication Data
US 2023/0202564 A1    Jun. 29, 2023

(30) Foreign Application Priority Data
Jun. 4, 2020    (SE) .................................. 2050646-5

(51) Int. Cl.
*B62D 21/02* (2006.01)
*B62D 21/15* (2006.01)
(Continued)

(52) U.S. Cl.
CPC ........... *B62D 21/02* (2013.01); *B62D 21/157* (2013.01); *B62D 25/025* (2013.01); *B62D 29/008* (2013.01)

(58) Field of Classification Search
CPC .... B62D 21/02; B62D 21/157; B62D 25/025; B62D 29/008
(Continued)

(56) References Cited

U.S. PATENT DOCUMENTS 3,860,258 A     1/1975   Feustel et al.
5,203,436 A  *  4/1993   Wieting .................... E06B 5/10
                                                      296/187.12
(Continued)

FOREIGN PATENT DOCUMENTS

DE    202016107254 U1    2/2017
DE    202018103481 U1    7/2018
(Continued)

OTHER PUBLICATIONS

International Search Report issued in PCT/EP2021/059051; mailed Jun. 25, 2021.
(Continued)

*Primary Examiner* — Amy R Weisberg
*Assistant Examiner* — Dana D Ivey
(74) *Attorney, Agent, or Firm* — Burr & Forman LLP

(57) ABSTRACT

A vehicle structure comprising a portion extending in a longitudinal direction, wherein the portion comprises a first member extending in the longitudinal direction and a second member extending in the longitudinal direction. The first member is configured to face an inside of a vehicle, and the second member is configured to face an outside of the vehicle. The first and second members are attached to one another to form a closed space between them. The portion comprises a wave-shaped first tubular reinforcement member located in the closed space.

19 Claims, 22 Drawing Sheets

(51) Int. Cl.
*B62D 25/02* (2006.01)
*B62D 29/00* (2006.01)

(58) Field of Classification Search
USPC .......................................................... 296/205
See application file for complete search history.

(56) References Cited

U.S. PATENT DOCUMENTS

| | | | |
|---|---|---|---|
| 5,698,055 A * | 12/1997 | Benkoczy ............. | B29C 70/542 |
| | | | 156/149 |
| 2002/0043821 A1 | 4/2002 | Takashina et al. | |
| 2012/0086238 A1 | 4/2012 | Tan | |
| 2018/0237075 A1 | 8/2018 | Kawabe et al. | |
| 2019/0256150 A1 | 8/2019 | Cooper et al. | |

FOREIGN PATENT DOCUMENTS

| | | | |
|---|---|---|---|
| EP | 00888952 A1 * | 1/1997 | |
| WO | 2019059821 A1 | 3/2019 | |

OTHER PUBLICATIONS

Written Opinion issued in PCT/EP2021/059051; mailed Jun. 25, 2021.
A Notice and Search Report issued by the Swedish Patent Office on Jan. 25, 2021, which corresponds to Swedish Patent Application No. 2050646-5.

* cited by examiner

VEHICLE STRUCTURE

TECHNICAL FIELD

Aspects of the present invention relate to a vehicle structure including a portion extending in a longitudinal direction, wherein the portion comprises a first member extending in the longitudinal direction and a second member extending in the longitudinal direction. The first member is configured to face an inside of a vehicle, and the second member is configured to face an outside of the vehicle. The first and second members are attached to one another to form a closed space.

BACKGROUND OF THE INVENTION

In the design of a frame portion of a motor vehicle, there is a compromise between weight and strength. An advantageous manner of obtaining a good compromise is to produce a frame portion from one or more metal plates or metal alloy plates formed into a requested shape, e.g. a hat profile.

In general, a frame portion of a motor vehicle is formed to have a certain rigidity since it may receive various impacts from the outside. At the same time, some frame portions should allow deformation for absorbing impacts when receiving an overload, e.g. due to a collision with an external object, e.g. another vehicle or a stationary object, e.g. a tree etc. One example of a vehicle frame portion that should be allowed to deform for absorbing impacts while being rigid is the vehicle side sill structure, or the bumper or bumper beam.

SUMMARY OF THE INVENTION

The inventors of the present invention have found that a frame portion, for example as discussed above, such as a vehicle structure, can be further improved.

An object of the embodiments of the present invention is thus to improve a frame portion or a vehicle structure.

The above-mentioned object and further objects are attained by providing a vehicle structure comprising a portion, wherein the portion extends in a longitudinal direction, and wherein the portion comprises
 a first member extending in the longitudinal direction, and
 a second member extending in the longitudinal direction,
 wherein the first member is configured to face an inside of a vehicle,
 wherein the second member is configured to face an outside of the vehicle,
 wherein the first and second members are attached to one another such that the first and second members form a closed space,
 wherein the portion comprises one or more first tubular reinforcement members located in the closed space, the first tubular reinforcement member having a longitudinal extension extending in the longitudinal direction,
 wherein the first tubular reinforcement member is corrugated and comprises corrugations, and
 wherein the corrugations of the first tubular reinforcement member comprise annular ridges and annular grooves.

An advantage of the innovative first tubular reinforcement member of the vehicle structure is that an advantageous deformation of the vehicle structure for absorbing impacts is provided while maintaining or improving the rigidity and reinforcement of the vehicle structure in order to prevent penetration upon collisions, for example lateral or side collisions. By means of the innovative first tubular reinforcement member, the weight and cost of the vehicle structure can be reduced while still maintaining or even improving the rigidity and reinforcement of the vehicle structure. By means of the innovative first tubular reinforcement member, the performance of the vehicle structure in collisions is improved, for example because the vehicle structure can be deformed in a more controlled and more predicted manner. An advantage of the vehicle structure including the innovative first tubular reinforcement member is that an improved vehicle structure is provided.

The vehicle structure may be a vehicle structure for a motor vehicle with a combustion engine, an electric vehicle having one or more electric batteries or a hybrid vehicle. For example, the vehicle may be a car or a truck. A "closed space" mentioned above also includes spaces which are substantially or essentially closed. For example, there may one or more minor openings in the walls forming the closed space and/or at the ends of the portion of the vehicle structure.

According to an advantageous embodiment of the vehicle structure according to the present invention, each of the annular ridges extends transversely to the longitudinal direction, wherein each of the annular grooves extends transversely to the longitudinal direction.

According to a further advantageous embodiment of the vehicle structure according to the present invention, the annular ridges and the annular grooves form, or build up, the first tubular reinforcement member. An advantage of this embodiment is that the performance of the vehicle structure in collisions is further improved. Thus, a further improved vehicle structure is provided. In alternative embodiments, the first tubular reinforcement member may have one or more sections without annular ridges and without annular grooves.

According to another advantageous embodiment of the vehicle structure according to the present invention, the cross-section of the first tubular reinforcement member forms an oval ring. An advantage of this embodiment is that an advantageous deformation of the vehicle structure for absorbing impacts is provided, while maintaining or improving the rigidity and reinforcement of the vehicle structure. An advantage of this embodiment is that the performance of the vehicle structure in collisions is further improved. Thus, a further improved vehicle structure is provided. The oval ring may have a minor diameter (which may be called the minor axis) that runs through the centre of the oval shape and through the shortest part of the oval shape defined, or limited, by the oval ring. The oval ring may have a major diameter (which may be called the major axis) that runs through the centre of the oval or elliptic shape and through the longest part of the oval shape defined, or limited, by the oval ring. In some embodiments, the major diameter may point toward the first and second members. An advantage of these embodiments is that the performance of the vehicle structure in collisions is further improved. Thus, a further improved vehicle structure is provided. In alternative embodiments, the cross-section of the first tubular reinforcement member may form a circular ring. The oval ring cross-section of the first tubular reinforcement member provides an increased extension, for example in the direction of a potential collision, and an improved rigidity and reinforcement with less material compared to a circular ring cross-section.

According to still another advantageous embodiment of the vehicle structure according to the present invention, the cross-section of each of the annular ridges forms an oval ring, and wherein the cross-section of each of the annular grooves forms an oval ring.

According to yet another advantageous embodiment of the vehicle structure according to the present invention, the cross-section of the first tubular reinforcement member forms an elliptic ring. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided. The elliptic ring may have a minor diameter (which may be called the minor axis) that runs through the centre of the elliptic shape and through the shortest part of the elliptic shape defined, or limited, by the elliptic ring, and the elliptic ring may have a major diameter (which may be called the major axis) that runs through the longest part of the elliptic shape defined, or limited, by the elliptic ring. In some embodiments, the major diameter may point toward the first and second members. An advantage of these embodiments is that the performance of the vehicle structure in collisions is further improved. Thus, a further improved vehicle structure is provided.

According to an advantageous embodiment of the vehicle structure according to the present invention, the cross-section of each of the annular ridges forms an elliptic ring, wherein the cross-section of each of the annular grooves forms an elliptic ring.

According to a further advantageous embodiment of the vehicle structure according to the present invention, the first tubular reinforcement member has an inner surface and an outer surface, wherein at the outer surface each of the annular ridges has a recess at a first location. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to another advantageous embodiment of the vehicle structure according to the present invention, the recesses at the first locations are in alignment with one another in the longitudinal direction. An advantage of this embodiment is that an advantageous deformation of the vehicle structure for absorbing impacts is provided, for example because the deformation can be designed and predicted in an improved manner, while maintaining or improving the rigidity and reinforcement of the vehicle structure. Thus, an advantage of this embodiment is that the performance of the vehicle structure in collisions is further improved. Therefore, a further improved vehicle structure is provided.

According to yet another advantageous embodiment of the vehicle structure according to the present invention, at the outer surface each of the annular ridges has a recess at a second location. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to still another advantageous embodiment of the vehicle structure according to the present invention, the second location is opposite to the first location. An advantage of this embodiment is that an advantageous deformation of the vehicle structure for absorbing impacts is provided, for example because the deformation can be designed and predicted in an improved manner, while maintaining or improving the rigidity and reinforcement of the vehicle structure. Thus, an advantage of this embodiment is that the performance of the vehicle structure in collisions is further improved. Therefore, a further improved vehicle structure is provided.

According to an advantageous embodiment of the vehicle structure according to the present invention, the recesses at the second locations are in alignment with one another in the longitudinal direction. An advantage of this embodiment is that an advantageous deformation of the vehicle structure for absorbing impacts is provided, for example because the deformation can be designed and predicted in an improved manner, while maintaining or improving the rigidity and reinforcement of the vehicle structure. Thus, an advantage of this embodiment is that the performance of the vehicle structure in collisions is further improved. Therefore, a further improved vehicle structure is provided.

According to a further advantageous embodiment of the vehicle structure according to the present invention, the annular ridges and the annular grooves form a smooth wave shape extending along the longitudinal extension of the first tubular reinforcement member in the longitudinal direction. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided.

According to another advantageous embodiment of the vehicle structure according to the present invention, the first tubular reinforcement member is seamless, for example free of one or more weld seams. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Further, by being seamless, for example free of one or more weld seams, the weight of the first tubular reinforcement member can be reduced, and thus the weight of the vehicle structure can be reduced, while maintaining or even improving the rigidity and reinforcement of the vehicle structure. Therefore, a further improved vehicle structure is provided. However, the first tubular reinforcement member of this embodiment may still be attached to the first or second member by welds or welding. In alternative embodiments, the first tubular reinforcement member may be formed from two or more curved members which are attached to one another, for example by welding, for example by weld seams, or by any other means of attachment.

According to still another advantageous embodiment of the vehicle structure according to the present invention, each of the annular ridges is more prominent toward the first member and toward the second member compared to a section of the annular ridge which extends between the first member and the second member. An advantage of this embodiment is that an advantageous deformation of the vehicle structure for absorbing impacts is provided, for example because the deformation can be tailored and designed and predicted in an improved manner, while maintaining or improving the rigidity and reinforcement of the vehicle structure. For example, the annular ridges are more prominent toward the location where the forces are the biggest upon a collision. Thus, an advantage of this embodiment is that the performance of the vehicle structure in collisions is further improved. Therefore, a further improved vehicle structure is provided. When each of the first and second members has a compartment extending in the longitudinal direction, and each compartment has a bottom surface, each of the annular ridges may be more prominent toward the bottom surface of the first member and toward the bottom surface of the second member compared to a section of the annular ridge which extends between the bottom surfaces the first member and the second member.

According to yet another advantageous embodiment of the vehicle structure according to the present invention, each of the annular ridges gradually increases in size from the section of the annular ridge, which extends between the first member and the second member, toward the first member and the second member. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. Therefore, a further improved vehicle structure is provided. When each of the first and second members has a compartment extending in the longitudinal direction, and each compartment has a bottom surface, each of the annular ridges gradually increases in size from the section of the annular ridge, which extends between the first member and the second member, toward the bottom surface of the first member and toward the bottom surface of the second member.

According to a further advantageous embodiment of the vehicle structure according to the present invention, each of the first and second members has a compartment extending in the longitudinal direction, wherein each compartment has a bottom surface, and wherein the first and second members are attached to one another such that the compartments and the first and second members form the closed space. In some embodiments, the above-mentioned major diameter may point toward the bottom surfaces of the first and second members.

According to an advantageous embodiment of the vehicle structure according to the present invention, each of the first and second members has a first side wall and a second side wall, wherein the first side wall is located on one side of the bottom surface while the second side wall is located on the opposite side of the bottom surface, wherein the first and second walls of the first member and the bottom surface of the first member define the compartment of the first member, wherein the first and second walls of the second member and the bottom surface of the second member define the compartment of the second member, wherein the first side wall of the first member is attached to the first side wall of the second member, and wherein the second side wall of the first member is attached to the second side wall of the second member.

According to a further advantageous embodiment of the vehicle structure according to the present invention, each of the first and second members has a first side wall and a second side wall, wherein the first side wall is located on one side of the bottom surface while the second side wall is located on the opposite side of the bottom surface, wherein the first and second walls of the first member and the bottom surface of the first member define the compartment of the first member, wherein the first and second walls of the second member and the bottom surface of the second member define the compartment of the second member, wherein each of the first and second members has a first flange attached to the first side wall, wherein each of the first and second members has a second flange attached to the second side wall, wherein the first flange of the first member is attached to the first flange of the second member, and wherein the second flange of the first member is attached to the second flange of the second member.

According to another advantageous embodiment of the vehicle structure according to the present invention, the portion comprises one or more second tubular reinforcement members located in the closed space,
  wherein the second tubular reinforcement member has a longitudinal extension extending in the longitudinal direction,
  wherein the second tubular reinforcement member is corrugated and comprises corrugations,
  wherein the second tubular reinforcement member forms an inner space, and
  wherein the first tubular reinforcement member is located in the inner space formed by the second tubular reinforcement member.

An advantage of this embodiment is that an advantageous deformation of the vehicle structure for absorbing impacts is provided, for example because the deformation can be tailored and designed and predicted in an improved manner, while maintaining or improving the rigidity and reinforcement of the vehicle structure. Thus, an advantage of this embodiment is that the performance of the vehicle structure in collisions is further improved.

According to still another advantageous embodiment of the vehicle structure according to the present invention, the longitudinal extension of the second tubular reinforcement member extends along the longitudinal extension of the first tubular reinforcement member. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved.

According to yet another advantageous embodiment of the vehicle structure according to the present invention, the second tubular reinforcement member encloses the first tubular reinforcement member. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved.

According to an advantageous embodiment of the vehicle structure according to the present invention, the corrugations of second tubular reinforcement member comprise ridges and grooves,
  wherein each ridge of the second tubular reinforcement member is in alignment with one of the annular ridges of the first tubular reinforcement member. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. However, for alternative embodiments, the ridges of the second tubular reinforcement member and the annular ridges of the first tubular reinforcement member may be arranged in other manners.

According to a further advantageous embodiment of the vehicle structure according to the present invention, each groove of the second tubular reinforcement member is in alignment with one of the annular grooves of the first tubular reinforcement member. An advantage of this embodiment is that an advantageous deformation of the vehicle structure for absorbing impacts is provided, while maintaining or improving the rigidity and reinforcement of the vehicle structure. Thus, an advantage of this embodiment is that the performance of the vehicle structure in collisions is further improved. However, for alternative embodiments, the grooves of the second tubular reinforcement member and the annular grooves of the first tubular reinforcement member may be arranged in other manners.

According to yet another advantageous embodiment of the vehicle structure according to the present invention, one or more of the first and second tubular reinforcement member is/are formed from one or more plates, for example a metal plate of a metal alloy plate. This is an efficient way to produce the first tubular reinforcement member.

According to still another advantageous embodiment of the vehicle structure according to the present invention, one or more of the first and second tubular reinforcement member comprises/comprise or consists/consist of a metal or a metal alloy. This is an efficient way to produce a strong first tubular reinforcement member.

According to an advantageous embodiment of the vehicle structure according to the present invention, each of the first and second members is formed from a plate, for example a metal plate or a metal allow plate. This is an efficient way to produce the first and second members.

According to a further advantageous embodiment of the vehicle structure according to the present invention, each of the first and second members comprises or consists of a metal or a metal alloy. This is an efficient way to produce strong first and second members.

According to another advantageous embodiment of the vehicle structure according to the present invention, each of the first and second members is one of: a hat profile and a U-profile. This is an efficient way to produce the first and second members and provide the closed space.

According still another advantageous embodiment of the vehicle structure according to the present invention, the vehicle structure is a vehicle side structure, wherein the portion is a side portion. The vehicle structure is suitable to be applied as a vehicle side structure of a vehicle, whereby the performance of a vehicle side structure in lateral or side collisions is improved. Thus, an improved vehicle side structure is provided. However, in alternative embodiments, the vehicle structure may be applied and mounted elsewhere to the vehicle, for example in the front of the vehicle, and may there be part of a bumper, in the rear of the vehicle, or elsewhere within the vehicle. The vehicle structure may for example be used in an electric vehicle or a hybrid vehicle, but of course also in a regular vehicle with a combustion engine only. The vehicle structure may be configured to protect an electric battery of an electric vehicle or a hybrid vehicle. Thus, the vehicle structure may be located at one or more sides of an electric battery located in a vehicle.

According to yet another advantageous embodiment of the vehicle structure according to the present invention, the portion is a side sill portion, and wherein the side sill portion extends in a longitudinal direction of a vehicle body and is provided at a side of the vehicle body. An advantage of this embodiment is that an advantageous deformation of the vehicle structure having a side sill portion for absorbing impacts is provided while maintaining or improving the rigidity and reinforcement of a vehicle structure. The innovative first tubular reinforcement member is especially advantageous for a side sill portion of the vehicle structure, where impacts should be absorbed upon certain collisions. However, in alternative embodiments, instead of a side sill portion, the portion or the side portion may be a side beam portion, a bumper portion, or a beam portion configured to be located elsewhere in a vehicle.

According to still advantageous embodiment of the vehicle structure according to the present invention, the side sill portion is attached to one or more cross beams of the vehicle body. Hereby, the rigidity of the vehicle structure may be further improved.

The above-mentioned features and embodiments of the vehicle structure may be combined in various possible ways providing further advantageous embodiments.

Further advantageous embodiments of the vehicle structure according to the present invention and further advantages with the embodiments of the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, where similar references are used for similar parts, in which.

DETAILED DESCRIPTION

Figure 1:
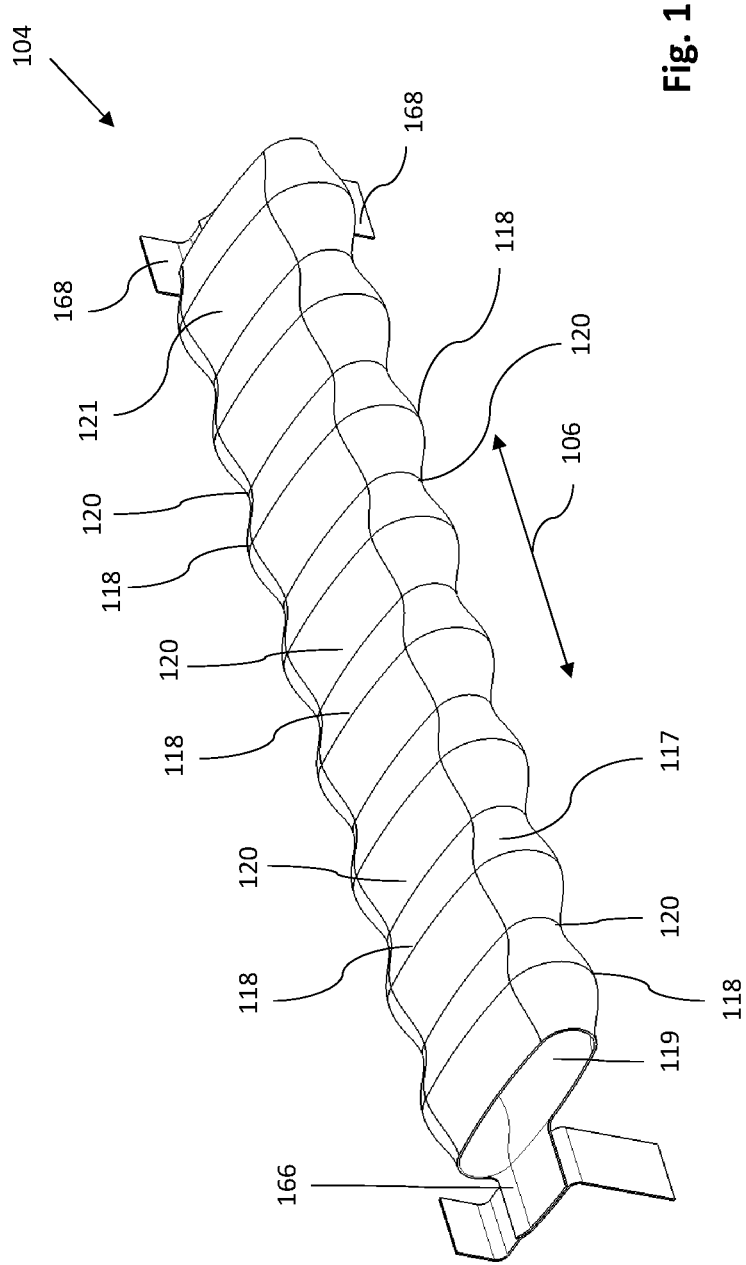
FIG. 1 is a schematic perspective view of a first tubular reinforcement member of a first embodiment of the vehicle structure according to the present invention.

With reference to FIGS. 1 and 5 to 8, a portion 102 of the vehicle structure 100 according to a first embedment includes a first tubular reinforcement member 104. The first tubular reinforcement member 104 has a longitudinal extension. The longitudinal extension extends in a longitudinal direction 106. The first tubular reinforcement member 104 may comprise or consist of a metal or a metal alloy, such as aluminium, or any other suitable material. The first tubular reinforcement member 104 may be formed from one or more plates, for example a metal plate or a metal alloy plate, such as a plate of aluminium, or any other suitable material, which may be processed by press hardening. Alternative production methods are mentioned hereinbelow. The first tubular reinforcement member 104 of the shown embodiment is smoothly wave-shaped in the longitudinal direction 106.

The first tubular reinforcement member 104 is corrugated and comprises corrugations 118, 120, wherein the corrugations 118, 120 of the first tubular reinforcement member 104 include annular ridges 118 and annular grooves 120. Each of the annular ridges 118 forms a ring. Each of the annular grooves 120 forms a ring. The first tubular reinforcement member 104 may be corrugated substantially along its entire longitudinal extension or length. The annular ridges 118 and the annular grooves 120 may thus form, or build up, the first tubular reinforcement member 104. In alternative embodiments, the first tubular reinforcement member 104 may have one or more sections without annular ridges 118 and annular grooves 120. The first tubular reinforcement member 104 comprises a plurality of annular ridges 118, for example five or ten annular ridges 118, or more, and a plurality of annular grooves 120, for example five or ten annular grooves 120, or more. By means of these innovative corrugations, an advantageous deformation of the vehicle structure 100, 400, 500 (see FIGS. 8 to 10) for absorbing impacts is attained while maintaining or improving the rigidity and reinforcement of the vehicle structure 100, 400, 500 (see FIGS. 8 to 10).

Figure 8:
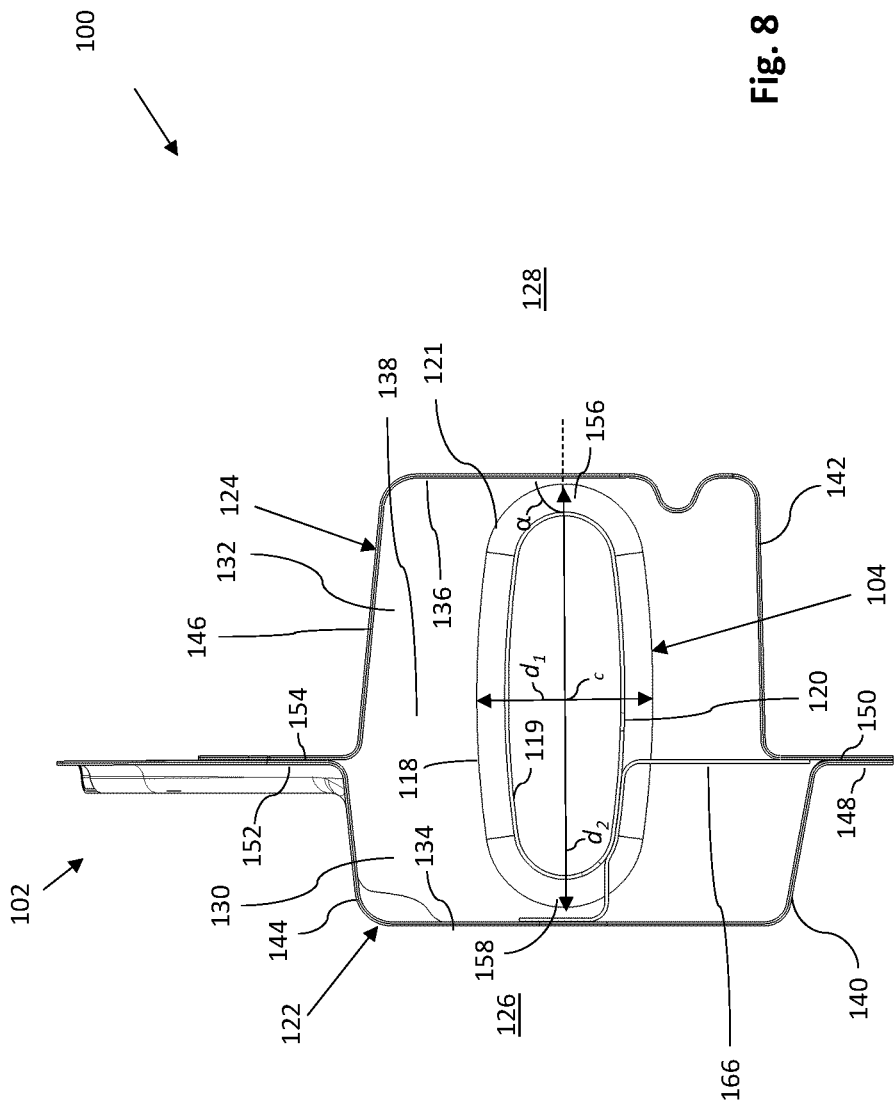
FIG. 8 is a cross-section of the assembled portion of the first embodiment of the vehicle structure of FIG. 7 including the first tubular reinforcement member of FIG. 1.

With reference to FIG. 1, each of the annular ridges 118 extends transversely to the longitudinal direction 106. Each of the annular grooves 120 extends transversely to the longitudinal direction 106. With reference to FIGS. 1 and 8, the cross-section of the first tubular reinforcement member 104 forms an oval ring. The cross-section of each of the annular ridges 118 forms an oval ring, and the cross-section of each of the annular grooves 120 forms an oval ring. With reference to FIGS. 1 and 8, the cross-section of the first tubular reinforcement member 104 may form an elliptic ring. The cross-section of each of the annular ridges 118 may form an elliptic ring, and the cross-section of each of the annular grooves 120 may form an elliptic ring. An elliptical ring includes shapes that may differ somewhat from a perfect ellipse. In alternative embodiments, the cross-section of the first tubular reinforcement member may form a circular ring. A circular ring includes shapes that may differ somewhat from a perfect circle.

With reference to FIG. 1, the annular ridges 118 and the annular grooves 120 form a smooth wave shape extending along the longitudinal extension of the first tubular reinforcement member 104 in the longitudinal direction 106.

With reference to FIGS. 1 and 8, the first tubular reinforcement member 104 is seamless, for example free of one or more weld seams. In alternative embodiments, the first tubular reinforcement member 104 may be formed from two or more curved members which are attached to one another, for example by welding, for example by weld seams or weld spots, or by any other means of attachment.

With reference to FIG. 1, the first tubular reinforcement member 104 has an inner surface 119 and an outer surface 121. The inner surface 119 may be called a concave surface. The outer surface 121 may be called a convex surface. A "concave surface" also includes surfaces which may deviate from a perfectly concave surface. A "convex surface" also includes surfaces which may deviate from a perfectly convex surface. In this disclosure, when annular ridges 118 and the annular grooves 120 are mentioned, it is referred to the outer surface 121 of the first tubular reinforcement member 104, i.e. the annular ridges 118 and the annular grooves 120 are formed on the outer surface 121 of the first tubular reinforcement member 104. However, it is to be understood that corresponding annular ridges and annular grooves may be formed on the inner surface 119 of the first tubular reinforcement member 104.

Figure 2:
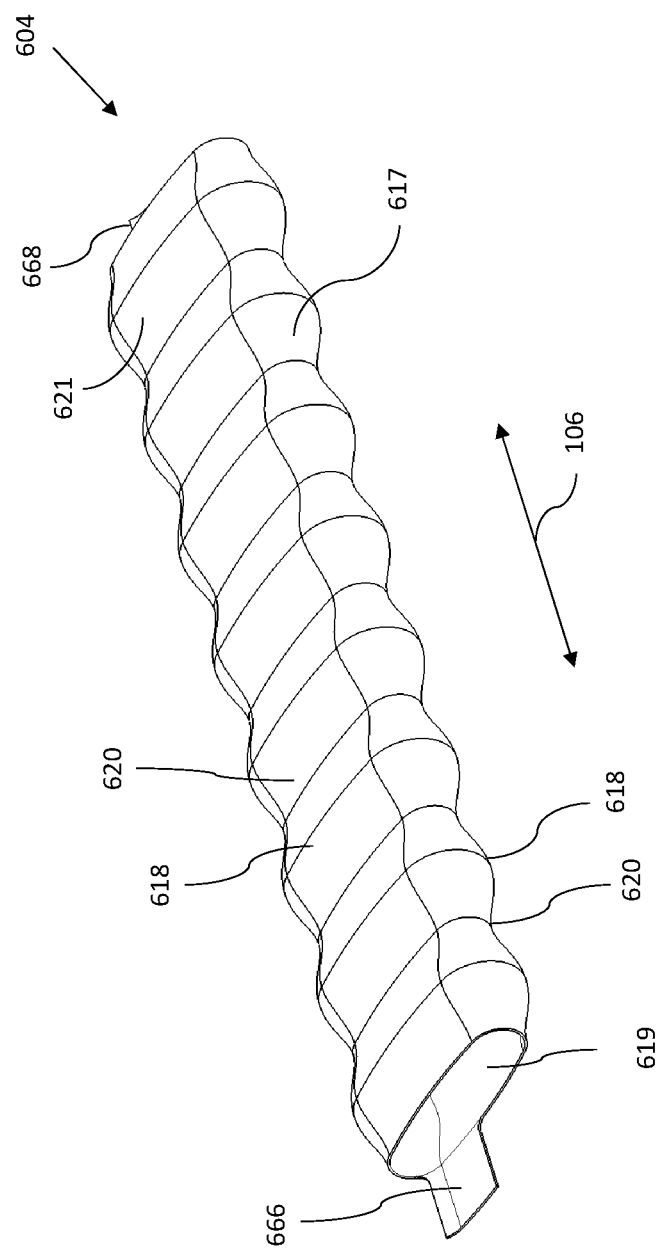
FIG. 2 is a schematic perspective view of a first tubular reinforcement member of a second embodiment of the vehicle structure according to the present invention.

With reference to FIGS. 1 and 8, the first tubular reinforcement member 104 may have one or more attachment tabs 166, 168 for attachment to a first member 122 or a second member 124, which is explained in further detail hereinbelow. However, the first tubular reinforcement member 104 may be provided without any attachment tab, or may be provided with one or more attachment tabs 666, 668 of a different design, for example as shown in the embodiment of the first tubular reinforcement member 604 schematically illustrated in FIG. 2. Otherwise, features of the first tubular reinforcement member 604 shown in FIG. 2 may correspond to features of the first tubular reinforcement member 104 shown in FIG. 1 and are thus not disclosed in further detail again, but include, for example, annular ridges 618, annular grooves 620, an inner surface 619 and an outer surface 621.

Figure 3:
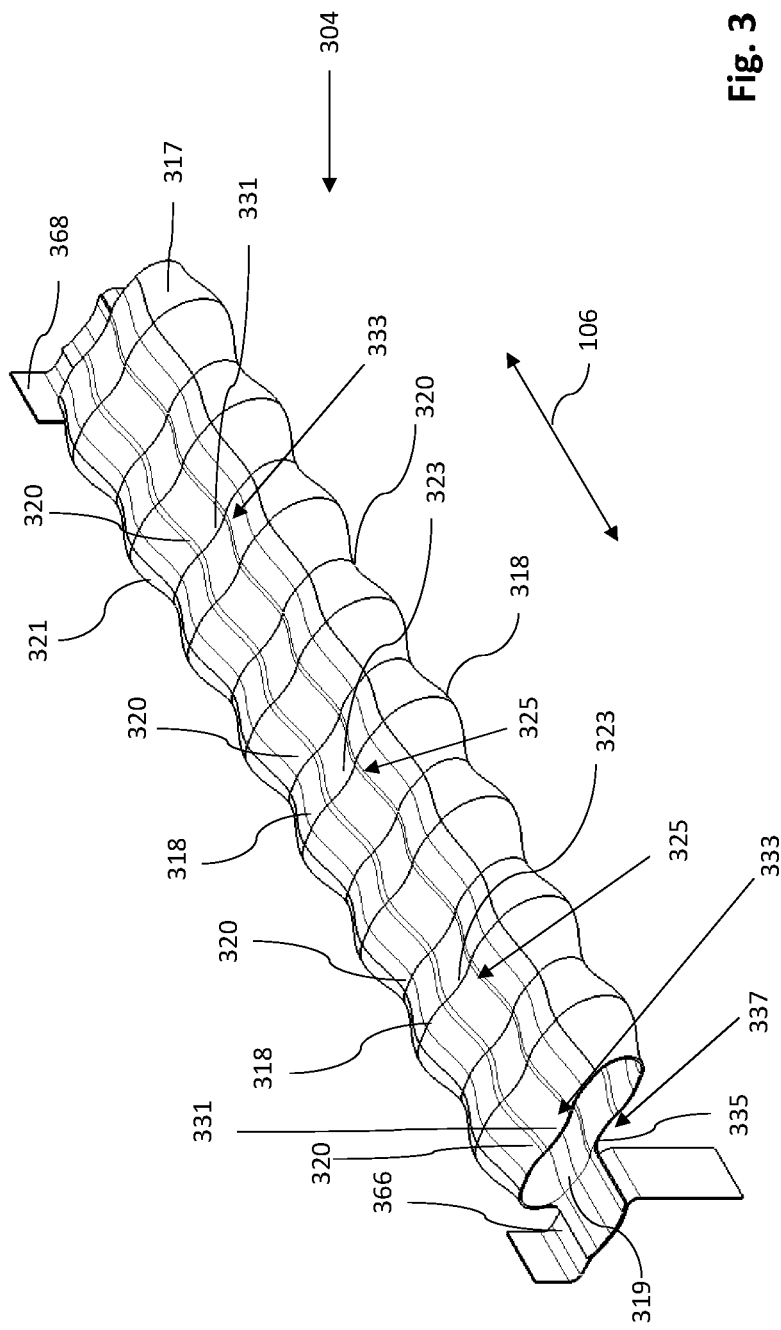
FIG. 3 is a schematic perspective view of a first tubular reinforcement member of a third embodiment of the vehicle structure according to the present invention.
Figure 4:
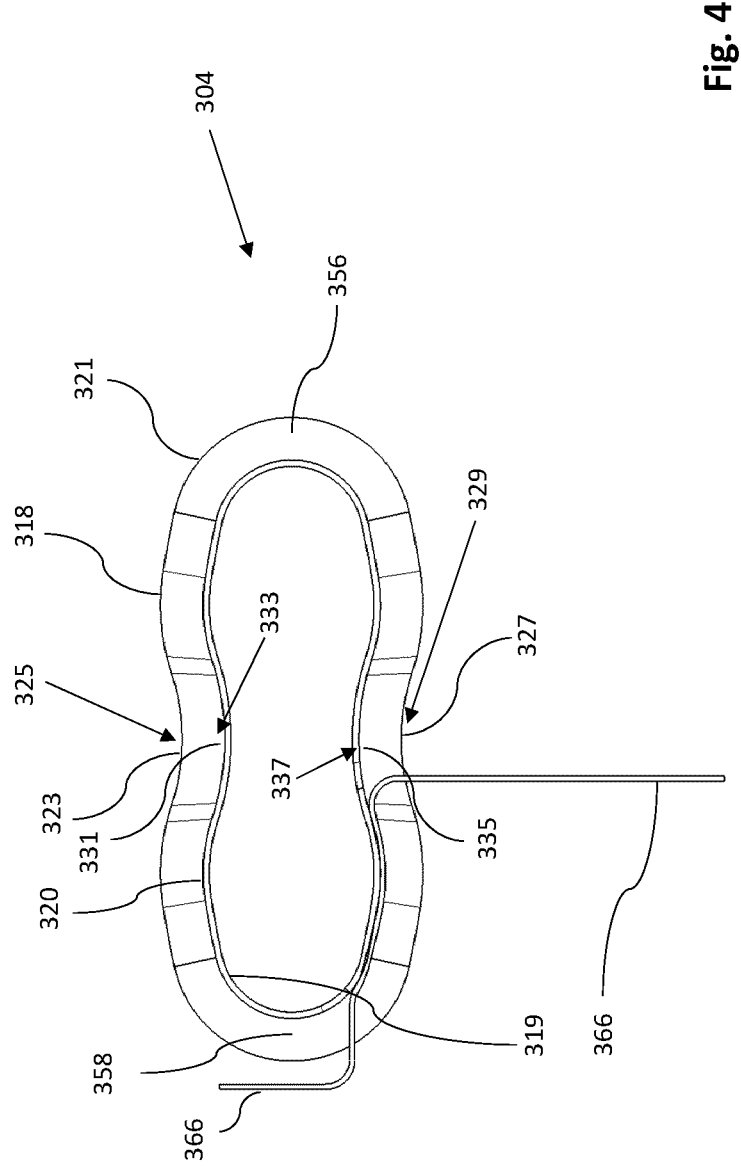
FIG. 4 is a cross-section of the first tubular reinforcement member shown in FIG. 3.
Figure 5:
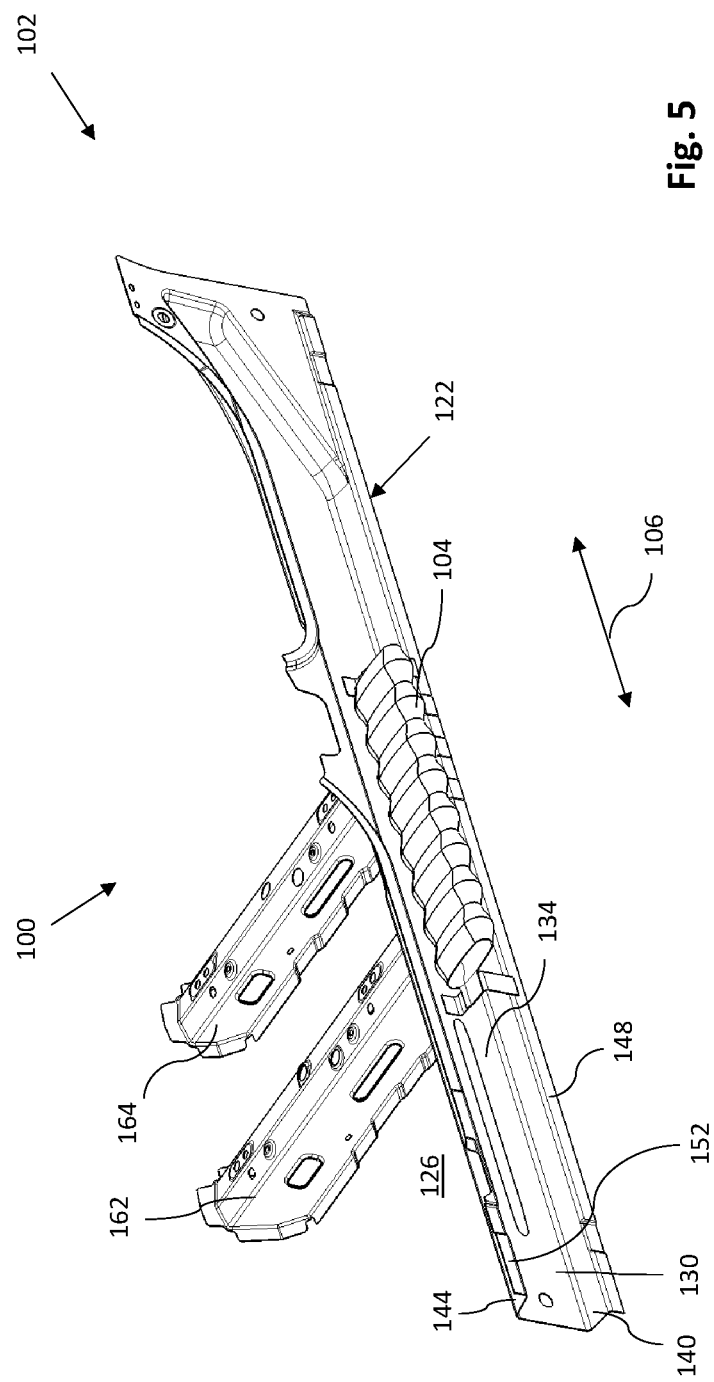
FIG. 5 is a partial schematic perspective view of a first embodiment of the vehicle structure according to the present invention, including the first tubular reinforcement member of FIG. 1.

With reference to FIGS. 3 and 4, a first tubular reinforcement member 304 of a third embodiment of the vehicle structure according to the present invention is schematically illustrated. As mentioned above in connection with FIG. 1, the first tubular reinforcement member 304 has annular ridges 318 and annular grooves 320, and the first tubular reinforcement member 304 has an inner surface 319 and an outer surface 321. At the outer surface 321 each of the annular ridges 318 has a recess 323 at a first location 325. The recesses 323 at the first locations 325 may be in alignment with one another in the longitudinal direction 106. At the outer surface 321 each of the annular ridges 318 may have a recess 327 at a second location 329. The second location 329 may be opposite to the first location 325, whereby a peanut-shaped cross-section of the first tubular reinforcement member 304 may be provided. The recesses 327 at the second locations 329 may be in alignment with one another in the longitudinal direction 106. Further, at the outer surface 321 each of the annular grooves 320 may have a recess 331 at a third location 333, wherein the recesses 331 at the third location 333 may be in alignment with one another in the longitudinal direction 106. Further, at the outer surface 321 each of the annular grooves 320 may have a recess 335 at a fourth location 337, wherein the recesses 335 at the fourth location 337 may be in alignment with one another in the longitudinal direction 106. The third location 333 may be opposite to the fourth location 337. The recesses 323 of the annular ridges 318 at the first location 325 may be substantially in alignment with the recesses 331 of the annular grooves 320 at the third location 333 in the longitudinal direction 106. The recesses 327 of the annular ridges 318 at the second location 329 may be substantially in alignment with the recesses 335 of the annular grooves 320 at the fourth location 337 in the longitudinal direction 106. For example, each recess 323, 327, 331, 335 may be a dent, a notch, or a depression. Otherwise, features of the first tubular reinforcement member 304 shown in FIGS. 3 and 4 may correspond to features of the first tubular reinforcement member 104 shown in FIG. 1 and are thus not repeated here. In alternative embodiments, the first tubular reinforcement member 304 of FIGS. 3 and 4 may be provided without attachment tabs 366, 368. In alternative embodiments, at the outer surface 321 the first tubular reinforcement member 304 may be provided with recesses 323, 327, 331, 335 at only one, two or three of the following locations: the first location 325; the second location 329; the third location 333; and the fourth location 337.

The first tubular reinforcement member 104, 604, 304 may be produced by various kinds of methods. As mentioned above, the first tubular reinforcement member 104, 604, 304 may for example be formed, for example press formed, from a plate. As mentioned above, the first tubular reinforcement member 104, 604, 304 may be formed from two or more curved members, which have been press formed from one or more plates and are subsequently attached to one another. Alternatively, the first tubular reinforcement member 104, 604, 304 may be formed through hydroforming, gas-forming (form blowing), for example hot metal gas forming (HMGF), for example from a tube. Other methods for producing the first tubular reinforcement member 104, 604, 304 are possible. Each of the first tubular reinforcement members 104, 604, 304 disclosed above may be described as a tube 104, 604, 304, wherein the tube 104, 604, 304, or the first tubular reinforcement member 104, 604, 304, has a wall 117, 617, 317 which is provided with, or includes, the annular ridges 118, 618, 318 and the annular grooves 120, 620, 320.

With reference to FIGS. 5 to 8, which schematically illustrate a first embodiment of the vehicle structure 100 according to the present invention, including the first tubular reinforcement member 104 of FIG. 1. The vehicle structure 100 may be a vehicle structure 100 for a motor vehicle, for example a car, or a truck. With reference to FIGS. 5 to 8, the vehicle structure 100 includes a portion 102, which extends in the longitudinal direction 106. The portion 102 has a first member 122 which extends in the longitudinal direction 106. The portion 102 has a second member 124 which extends in the longitudinal direction 106. The first member 122 is configured to face an inside 126 of a vehicle, for example a motor vehicle, such as a car. The second member 124 is configured to face an outside 128 of the same vehicle. Thus, when the vehicle structure 100 has been installed, the first member 122 may face the inside 126 of the vehicle while the second member 124 may face the outside 128 of the same vehicle. Each 122, 124 of the first and second members 122, 124 may have a compartment 130, 132 which extends in the longitudinal direction 106. Each compartment 130, 132 may have a bottom surface 134, 136.

With reference to FIG. 8, the first and second members 122, 124 are attached to one another such that the first and second members 122, 124 form a closed space 138. A "closed space" 138 in the present disclosure also includes spaces which are substantially or essentially closed. For example, there may be one or more minor openings in the walls forming the closed space 138 and/or at the ends of the portion 102 of the vehicle structure 100, but still the space 138 is to be considered to be closed. More specifically, in the shown embodiment, the first and second members 122, 124 are attached to one another such that the compartments 130, 132 and the first and second members 122, 124 form or define the closed space 138. The first and second members 122, 124 may be attached to one another for example by means of welding, an adhesive or a mechanical locking structure, such as rivets, or any other suitable fastening means etc. Each 122, 124 of the first and second members 122, 124 may comprise or consist of a metal or a metal alloy, such as aluminium or any other suitable material. Each 122, 124 of the first and second members 122, 124 may be formed from a plate, for example a metal plate or a metal alloy plate, such as a plate of aluminium, which may be processed by press hardening.

With reference to FIGS. 5 to 8, each 122, 124 of the first and second members 122, 124 in the shown embodiment is, or comprises, a hat profile. However, in other embodiments, each of the first and second members 122, 124 may instead comprise a U-profile, or any other suitable profile. More specifically, in the shown embodiment, each 122, 124 of the first and second members 122, 124 has a first side wall 140, 142 and a second side wall 144, 146. The first side wall 140, 142 is located on one side of the bottom surface 134, 136 while the second side wall 144, 146 is located on the opposite side of the bottom surface 134, 136. The first and second walls 140, 144 of the first member 122 and the bottom surface 134 of the first member 122 define or form the compartment 130 of the first member 122. In a corresponding way, the first and second walls 142, 146 of the second member 124 and the bottom surface 136 of the second member 124 define or form the compartment 132 of the second member 124. With reference to FIGS. 5 to 8, each 122, 124 of the first and second members 122, 124 has a first flange 148, 150 attached to, for example formed integrally with, the first side wall 140, 142. Each 122, 124 of the first and second members 122, 124 has a second flange 152, 154 attached to, for example formed integrally with, the second side wall 144, 146. The first flange 148 of the first member 122 is attached, for example by means of welding or an adhesive, to the first flange 150 of the second member 124. The second flange 152 of the first member 122 is attached, for example by means of welding or an adhesive, to the second flange 154 of the second member 124. However, other means of attachments are possible, for example as mentioned above.

In alternative embodiments, each 122, 124 of the first and second members 122, 124 could be a U-profile. Then, the first side wall 140 of the first member 122 could be attached, for example by means of welding, to the first side wall 142 of the second member 124, and the second side wall 144 of the first member 122 could be attached, for example by means of welding, to the second side wall 146 of the second member 124. However, other means of attachment are possible, for example as mentioned above.

The portion 102 includes one or more first tubular reinforcement members 104, for example as disclosed in connection with FIGS. 1 to 4, located in the closed space 138. In the embodiment shown in FIGS. 5 to 8, the portion 102 includes one first tubular reinforcement members 104. The first tubular reinforcement member 104 extends in the longitudinal direction 106. It is to be understood that one or more additional sections or one or more additional members may be placed between the first and second members 122, 124 and/or between the first or second member 122, 124 and the inside 126 or the outside 128 of the vehicle, especially when the vehicle is assembled.

With reference to FIG. 8, the oval or elliptic ring formed by the cross-section of the annular ridge 118 or the cross-section of the annular groove 120 may have a minor diameter $d_1$ (which may be called the minor axis) that runs through the centre c of the oval or elliptic shape and through the shortest part of the oval or elliptic shape defined, or limited, by the oval or elliptic ring. The oval or elliptic ring may have a major diameter $d_2$ (which may be called the major axis) that runs through the centre c of the oval or elliptic shape and through the longest part of the oval or elliptic shape defined, or limited, by the oval or elliptic ring. In some embodiments, the major diameter $d_2$ may point toward the first and second members 122, 124. When each of the first and second members 122, 124 has a compartment 130, 132 extending in the longitudinal direction 106, and each compartment 130, 132 has a bottom surface 134, 136, the major diameter $d_2$ may point toward the bottom surfaces 134, 136 of the first and second members 122, 124. The major diameter $d_2$ may form an angle α with the bottom surface 134, 136 of the first member 122 or the second member 124, wherein said angle α may be between 70 and 110 degrees, for example between 80 and 100 degrees, such as between 85 and 95 degrees, for example approx. 90 degrees. The oval or elliptic ring cross-section of the first tubular reinforcement member 104 provides an increased extension of the first tubular reinforcement member 104 in the direction of a potential collision or impact and an improved rigidity and reinforcement of the vehicle structure 100 but with less material, compared to a first tubular reinforcement member having a circular ring cross-section.

With reference to FIG. 8, it may be defined that the oval or elliptic ring formed by the cross-section of the annular ridge 118 has two apex sections 156, 158 or pointed sections 156, 158, which are more prominent or more pointed than any other apex of the oval or elliptic ring present between two apex sections 156, 158. Each of the apex sections 156, 158 of the oval or elliptic ring may point toward the first or second member 122, 124. When each of the first and second members 122, 124 has a compartment 130, 132 extending in the longitudinal direction 106, and each compartment 130, 132 has a bottom surface 134, 136, each of the apex sections 156, 158 of the oval or elliptic ring may point toward the bottom surface 134, 136 of the first or second member 122, 124.

Figure 6:
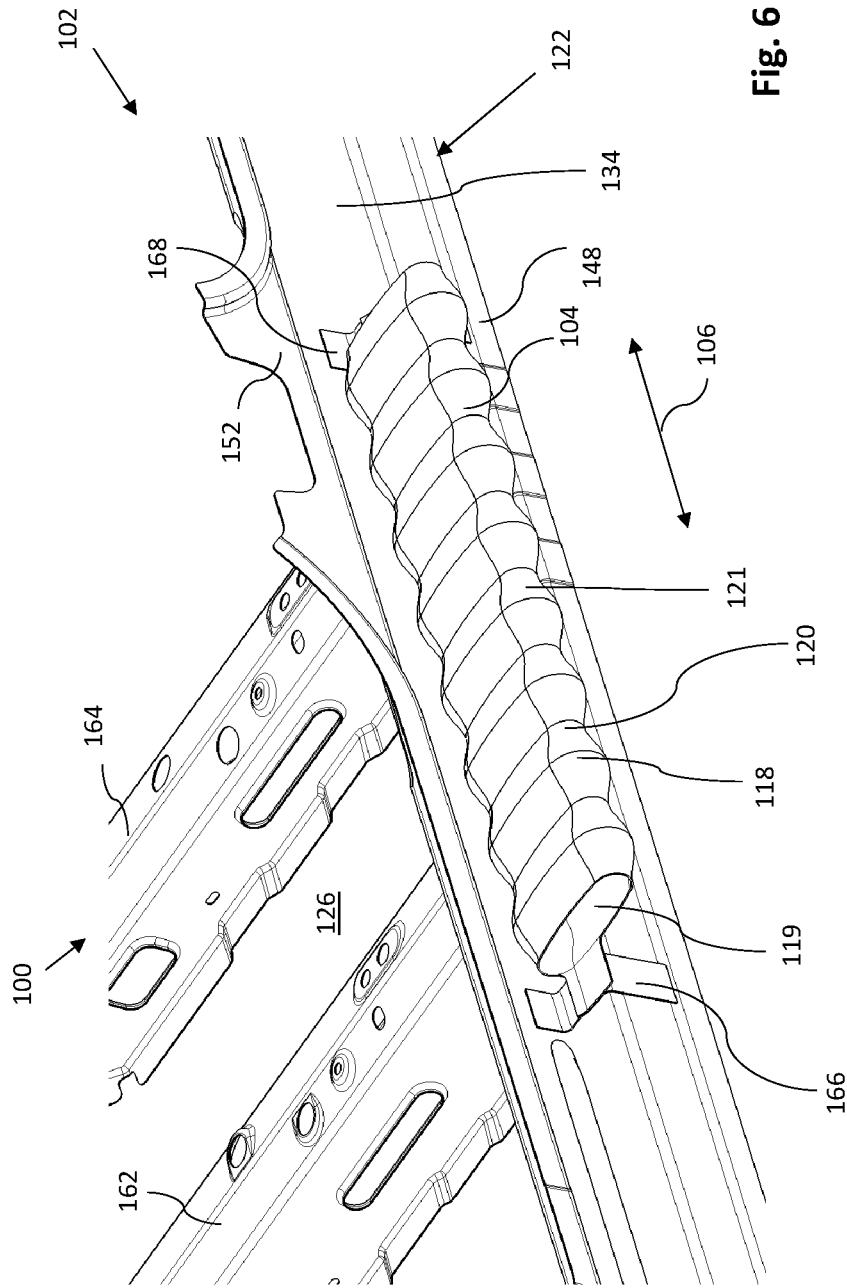
FIG. 6 is an enlargement of a section of the vehicle structure of FIG. 5, illustrating the position of the first tubular reinforcement member of the vehicle structure.
Figure 7:
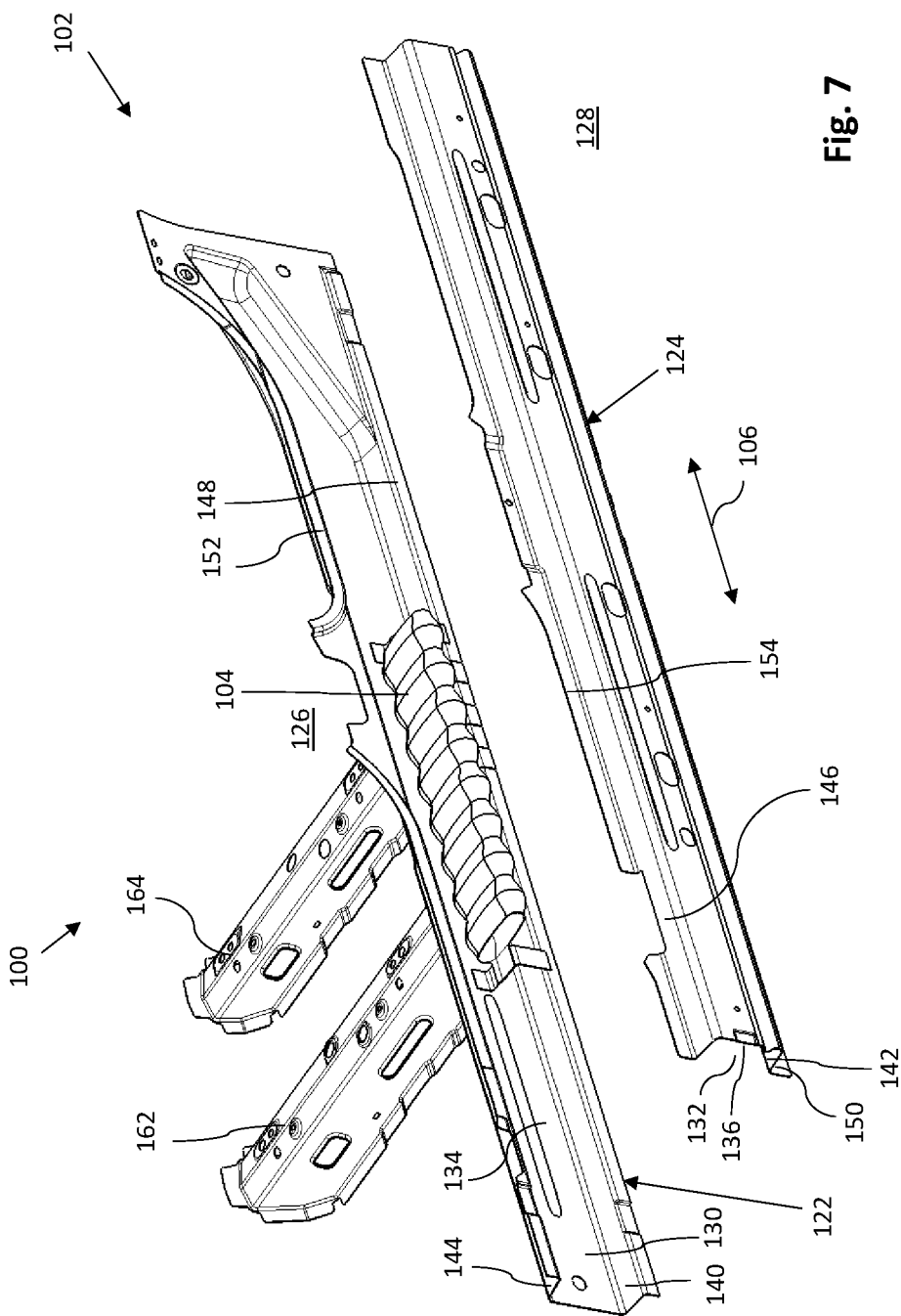
FIG. 7 is a schematic exploded perspective view of the first embodiment of the vehicle structure of FIG. 8.

With reference to FIGS. 6 and 8, the first tubular reinforcement member 104 may be attached to the first or second member 122, 124 via the above-mentioned attachment tab 166, 168. The attachment tab 166, 168 may be attached to one of the first and second members 122, 124 by means of welding, such as a weld spot, an adhesive or a mechanical locking structure, such as rivets, or any other suitable fastening means etc. However, the first tubular reinforcement member 104 may be attached to one of the first and second members 122, 124 via any other structure or means. For example, one or more annular ridges 118 of the first tubular reinforcement member 104 may be attached to one of the first and second members 122, 124, for example to the bottom surface 134, 136 of one of the first and second members 122, 124, by means of welding, such as a weld spot, an adhesive or a mechanical locking structure, or any other suitable fastening means etc.

Figure 9:
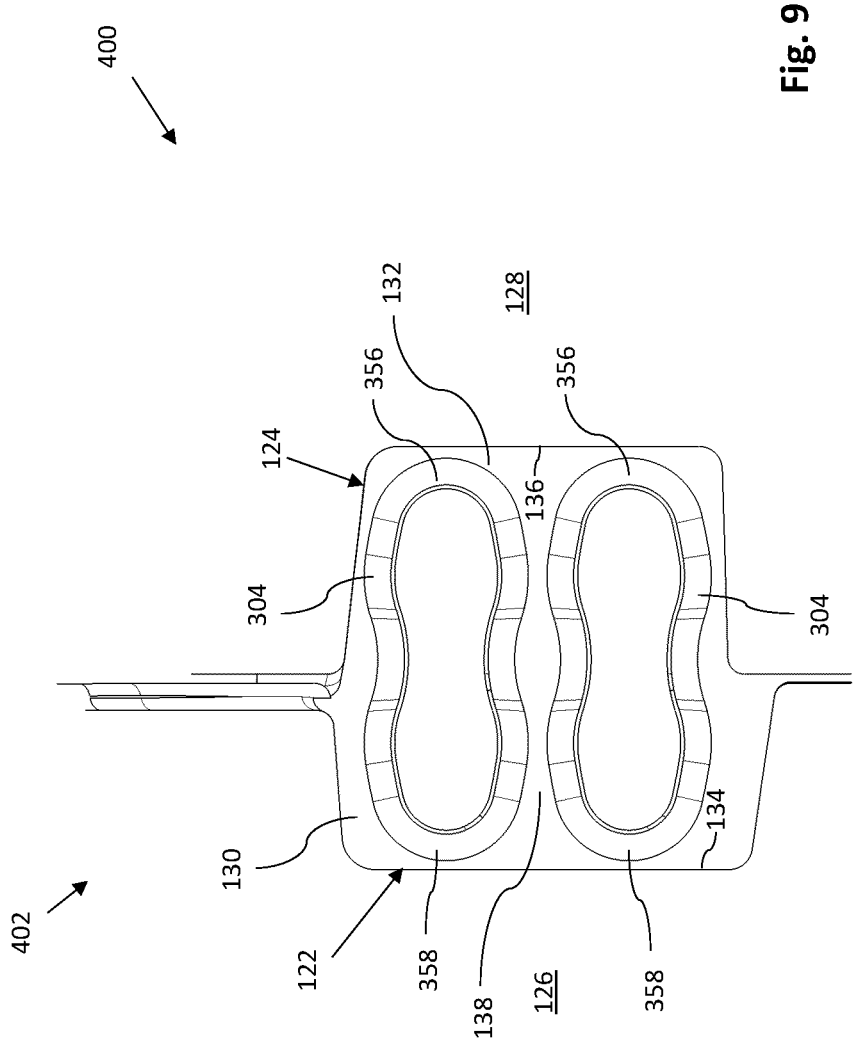
FIG. 9 is a schematic cross-section of an assembled portion of a fourth embodiment of the vehicle structure including two first tubular reinforcement members.

With reference to the first tubular reinforcement member 304 shown in FIGS. 3 and 4 and the assembled portion 402 of the fourth embodiment of the vehicle structure 400 shown in FIG. 9, it may be defined that the ring formed by the cross-section of the annular ridge 318 has two major apex sections 356, 358 or major pointed sections 356, 358, which are more prominent or more pointed than any other apex of said ring present between the two major apex sections 356, 358. Each of the major apex sections 356, 358 may point toward the first or second member 122, 124. When each of the first and second members 122, 124 has a compartment 130, 132 extending in the longitudinal direction 106, and each compartment 130, 132 has a bottom surface 134, 136, each of the major apex sections 356, 358 may point toward the bottom surface 134, 136 of the first or second member 122, 124. With reference to the fifth embodiment of the vehicle structure 500 shown in FIG. 10, each of the major apex sections 356, 358 of said ring may point toward one 140, 142, 144, 146 of the first and second side walls 140, 142, 144, 146 of the first or second member 122, 124.

Figure 10:
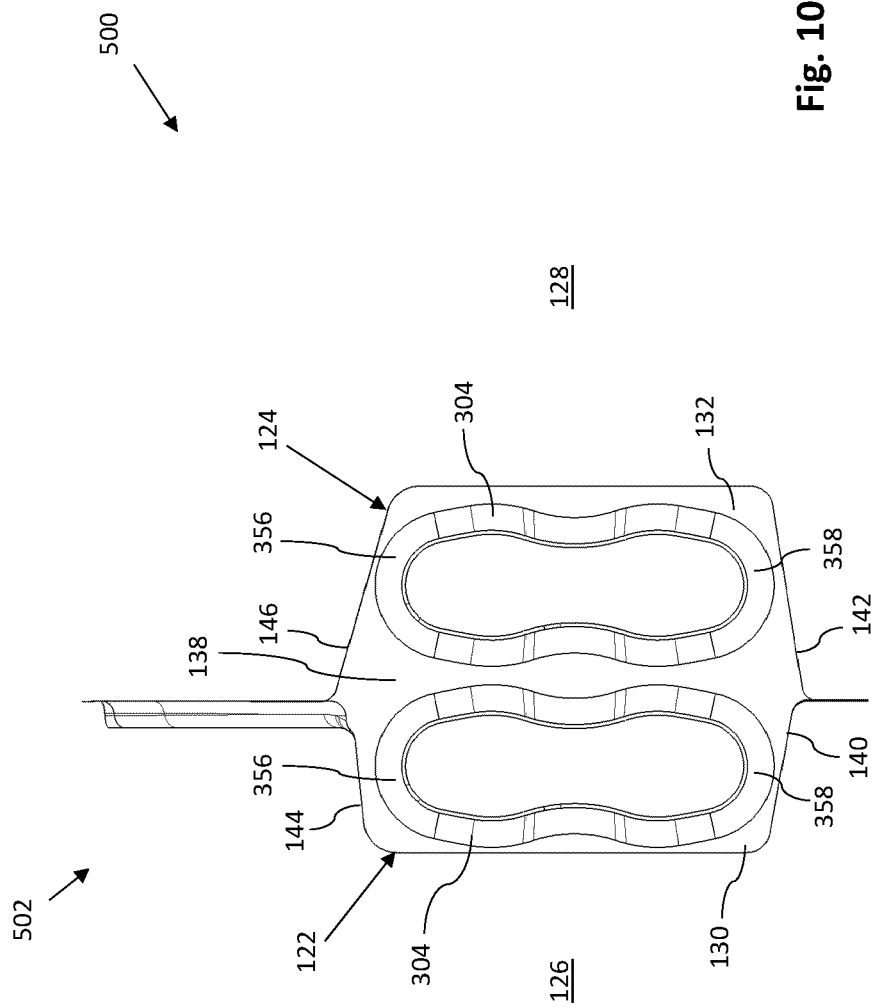
FIG. 10 is a schematic cross-section of an assembled portion of a fifth embodiment of the vehicle structure including two first tubular reinforcement members arranged differently in relation to the positions of the two first tubular reinforcement members in FIG. 9.

With reference to FIGS. 9 and 10, the portion 402, 502 of embodiments of the vehicle structure 400, 500 may comprise two or more first tubular reinforcement members 304 arranged as shown in FIGS. 9 and 10, respectively. Each first tubular reinforcement member 304 may correspond to any one of the embodiments of the first tubular reinforcement member 304 disclosed above, for example the first tubular reinforcement member 304 of FIGS. 3 and 4, and is thus not described in further detail here. With reference to FIG. 9, the two first tubular reinforcement members 304 may be arranged on top of one another when viewed in the longitudinal direction 106 when the vehicle structure 400 has been installed. With reference to FIG. 10, the two first tubular reinforcement members 304 may be arranged side by side, i.e. laterally arranged, when viewed in the longitudinal direction 106 when the vehicle structure 500 has been installed. In alternative embodiment, the portion may include three, four or more first tubular reinforcement members 104, 604, 304. It is to be understood that each of the first tubular reinforcement members 304 shown in FIGS. 9 and 10 may be replaced by any other version of the first tubular reinforcement member 104, 604, 304, for example any one 104, 604 of the first tubular reinforcement members 104, 604 shown in FIGS. 1 and 2. It is also possible to mix different versions of the first tubular reinforcement members 104, 604, 304 within the same closed space 138.

Figure 11:
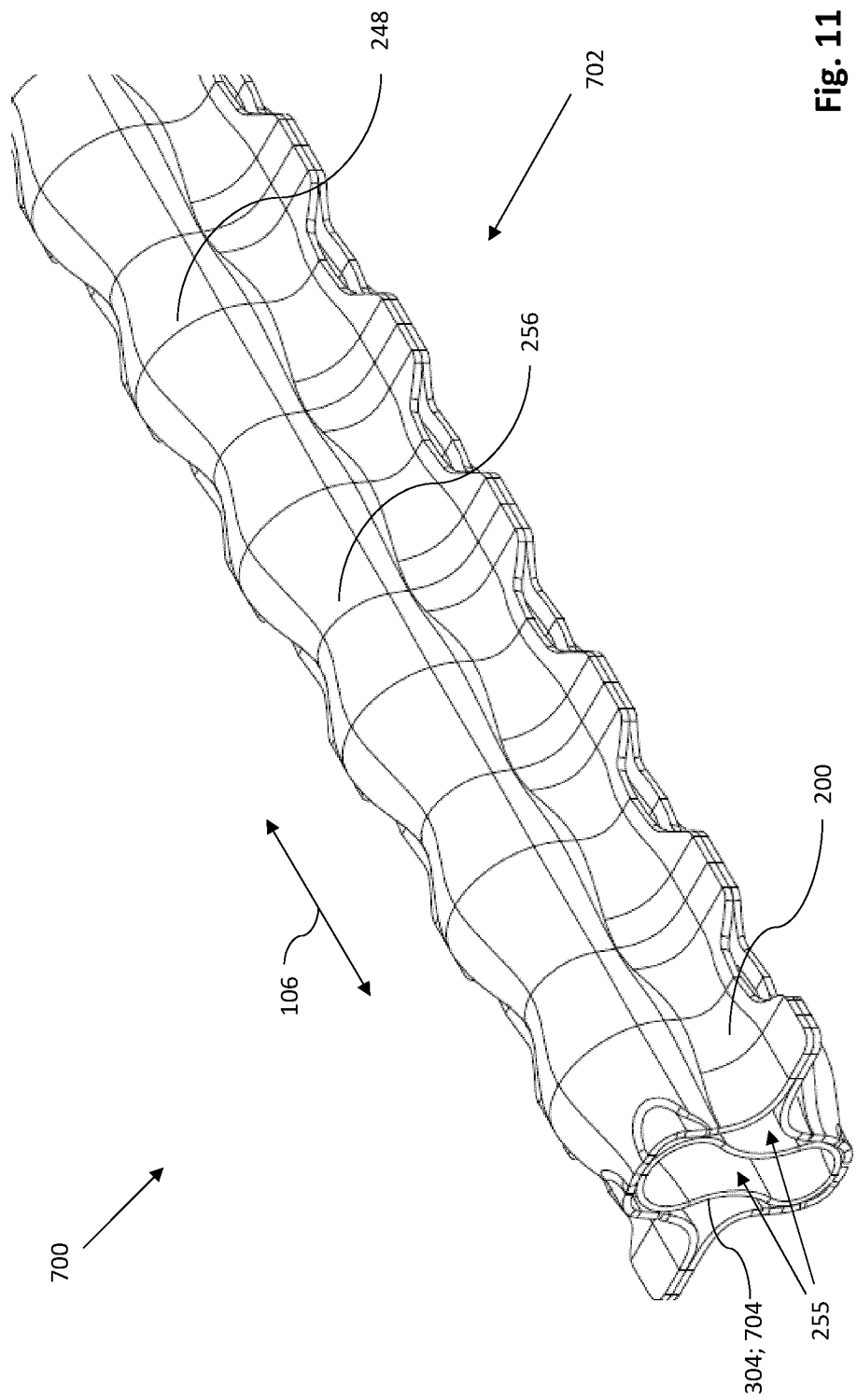
FIG. 11 is a schematic perspective view of two tubular reinforcement members of a sixth embodiment of the vehicle structure according to the present invention.
Figure 12:
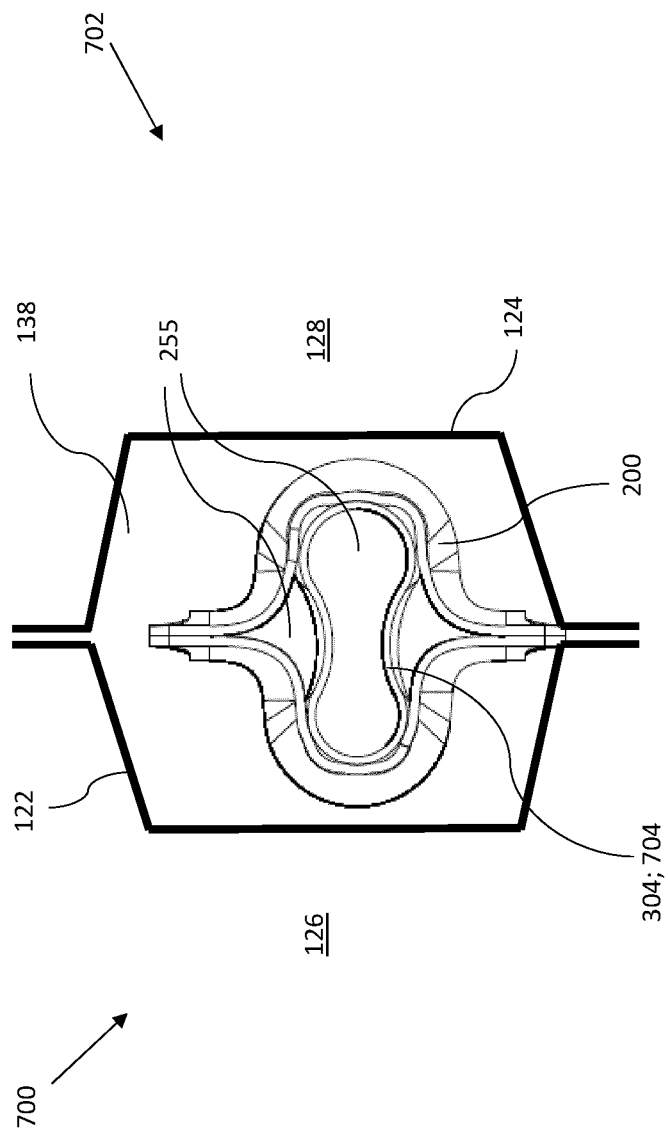
FIG. 12 is a schematic cross-section of the embodiment of FIG. 11.

With reference to FIGS. 11 and 12, two tubular reinforcement members 704, 200 of a sixth embodiment of the vehicle structure 700 according to the present invention are schematically illustrated. The first tubular reinforcement member 704 of the two tubular reinforcement members 704, 200 may correspond to any one of the embodiments disclosed above, for the example the first tubular reinforcement member 304 of FIGS. 3 and 4. In addition to the first tubular reinforcement member 704, the portion 702 of the vehicle structure 700 of FIGS. 11 and 12 includes one or more second tubular reinforcement members 200 located in the closed space 138 formed by the first and second members 122, 124. In the embodiment illustrated in FIGS. 11 and 12, one second tubular reinforcement members 200 is provided.

With reference to FIGS. 11 and 12, the second tubular reinforcement member 200 has a longitudinal extension extending in the longitudinal direction 106. The second tubular reinforcement member 200 is corrugated and includes corrugations. The second tubular reinforcement member 200 forms an inner space 255. With reference to FIGS. 11 and 12, the first tubular reinforcement member 704 is located in the inner space 255 formed by the second tubular reinforcement member 200. It is to be understood that the second tubular reinforcement member 200 may be designed in other ways than what is illustrated in FIGS. 11 to 18.

With reference to FIGS. 11 and 12, for some embodiments, the longitudinal extension of the second tubular reinforcement member 200 may extend along the longitudinal extension, for example along the entire the longitudinal extension, of the first tubular reinforcement member 704. For some embodiments, the second tubular reinforcement member 200 may enclose the first tubular reinforcement member 704.

With reference to FIGS. 11 to 18, for some embodiments, the corrugations of second tubular reinforcement member 200 may include ridges 242, 244, 246, 248 and grooves 250, 252, 254, 256. With reference to FIGS. 3 and 11 to 18, each ridge 242, 244, 246, 248 of the second tubular reinforcement member 200 may be in alignment with one 318 of the annular ridges 318 of the first tubular reinforcement member 304; 704. For some embodiments, each groove 250, 252, 254, 256 of the second tubular reinforcement member 200 may be in alignment with one of the annular grooves 320 of the first tubular reinforcement member 304; 704.

With reference to FIGS. 13 to 18, an embodiment of the second tubular reinforcement member 200 of FIGS. 11 and 12 is schematically illustrated in isolation from the first tubular reinforcement member 304; 704 of FIGS. 11 and 12 in order to illustrate the mounting of the first and second tubular reinforcement members 704, 200 to a portion 204 of a vehicle structure 202. However, it is to be understood that a first tubular reinforcement member 704, 104, 604, 304 according to any one of the embodiments disclosed above may be inserted into the second tubular reinforcement member 200.

With reference to FIGS. 13 to 18, the second tubular reinforcement member 200 may comprise a third reinforcement member 218 and a fourth reinforcement member 220. Each one 218, 220 of the third and fourth reinforcement members 218, 220 extends in the same longitudinal direction 106. The second tubular reinforcement member 200 may comprise or consist of a metal or a metal alloy, such as aluminium, or any other suitable material. The second tubular reinforcement member 200 may be formed from one or more plates, for example a metal plate or a metal alloy plate, such as a plate of aluminium, or any other suitable material, which may be processed by press hardening. Each one 218, 220 of the third and fourth reinforcement members 218, 220 may be formed from a plate, for example a metal plate, such as a plate of aluminium, or any other suitable material, which may be processed by press hardening. Each one 218, 220 of the third and fourth reinforcement members 218, 220 may be smoothly wave-shaped in the longitudinal direction 106.

With reference to FIGS. 13 to 18, each one 218, 220 of the third and fourth reinforcement members 218, 220 may have a first leg 222, 224 which extends in a direction transverse to the longitudinal direction 106. Each one 218, 220 of the third and fourth reinforcement members 218, 220 may have a second leg 226, 228 which extends in a direction transverse to the longitudinal direction 106. Each one 222, 224, 226, 228 of the first and second legs 222, 224, 226, 228 has a foot 230, 232, 234, 236 which extends in the longitudinal direction 106. For some embodiments, it may be defined that the foot 230 of the first leg 222 is located at an end of the first leg 222, or that the foot 230 of the first leg 222 forms an end of the first leg 222. For some embodiments, it may be defined that the foot 234 of the second leg 226 is located at an end of the second leg 226, or that the foot 234 of the second leg 226 forms an end of the second leg 226.

Figure 13:
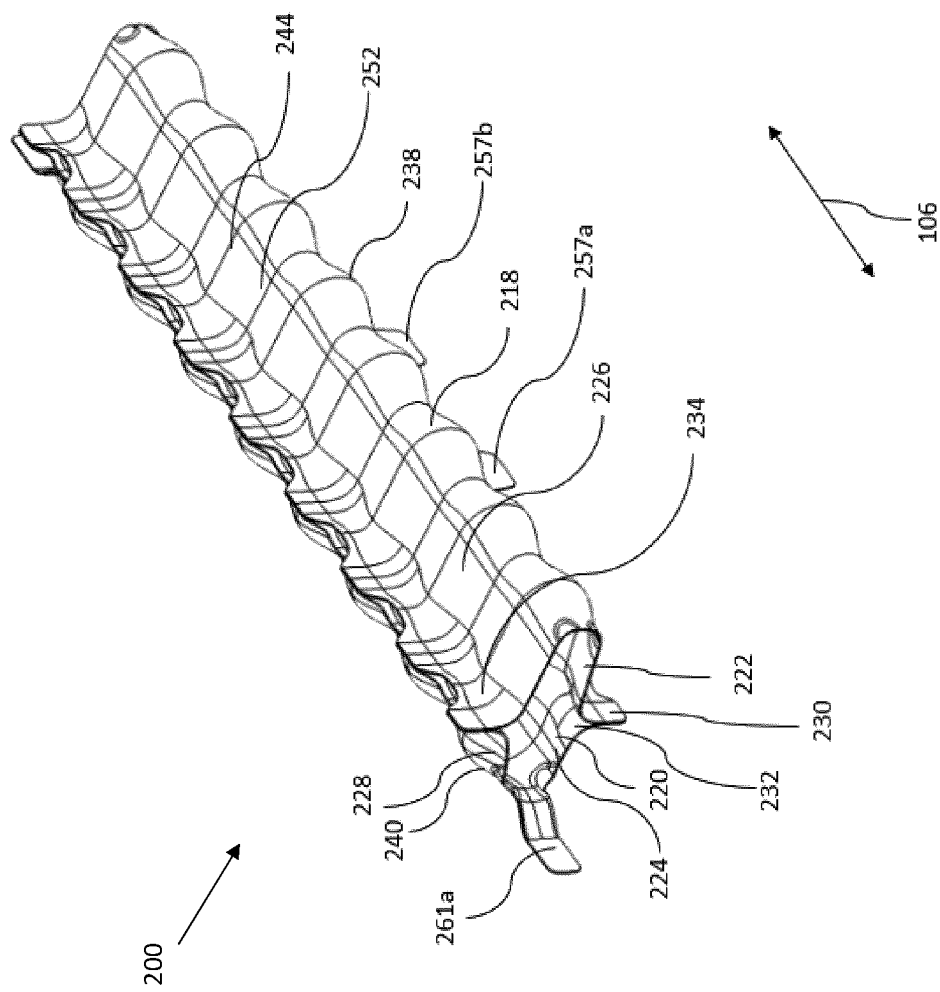
FIG. 13 is a schematic perspective view of an embodiment of the second tubular reinforcement member of FIGS. 11 and 12.
Figure 14:
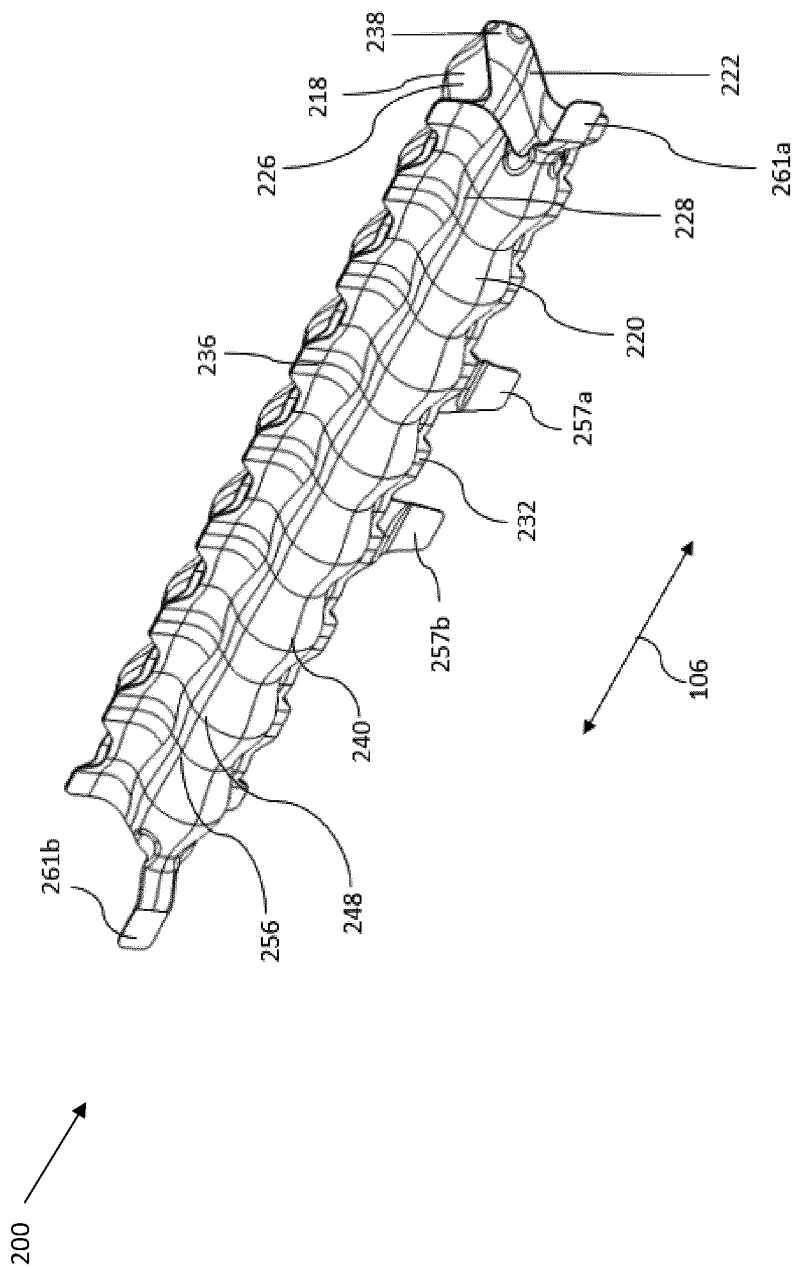
FIG. 14 is a schematic perspective view of the second tubular reinforcement member of FIG. 13 from a different perspective.
Figure 15:
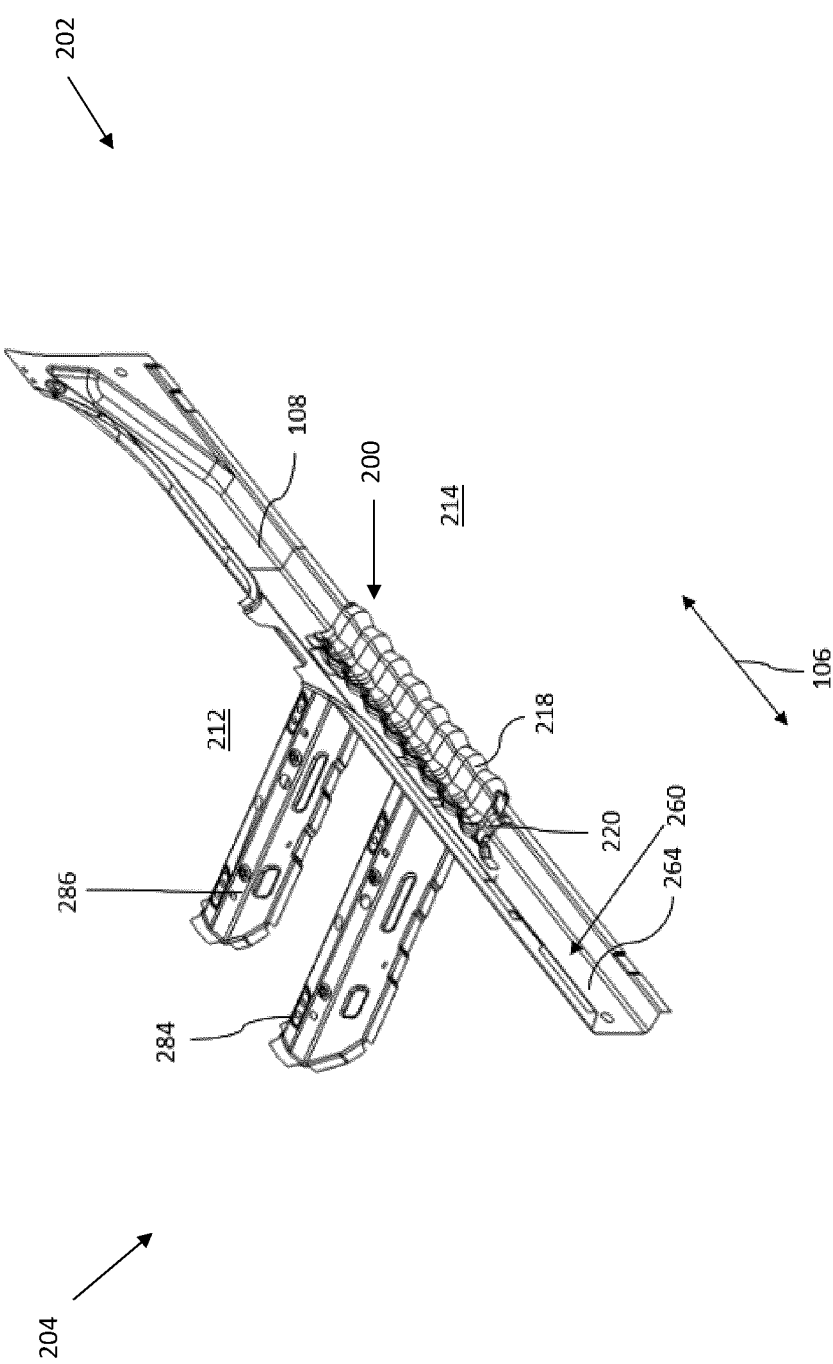
FIG. 15 is a partial schematic perspective view of a vehicle structure including the second tubular reinforcement member of FIGS. 13 and 14.
Figure 16:
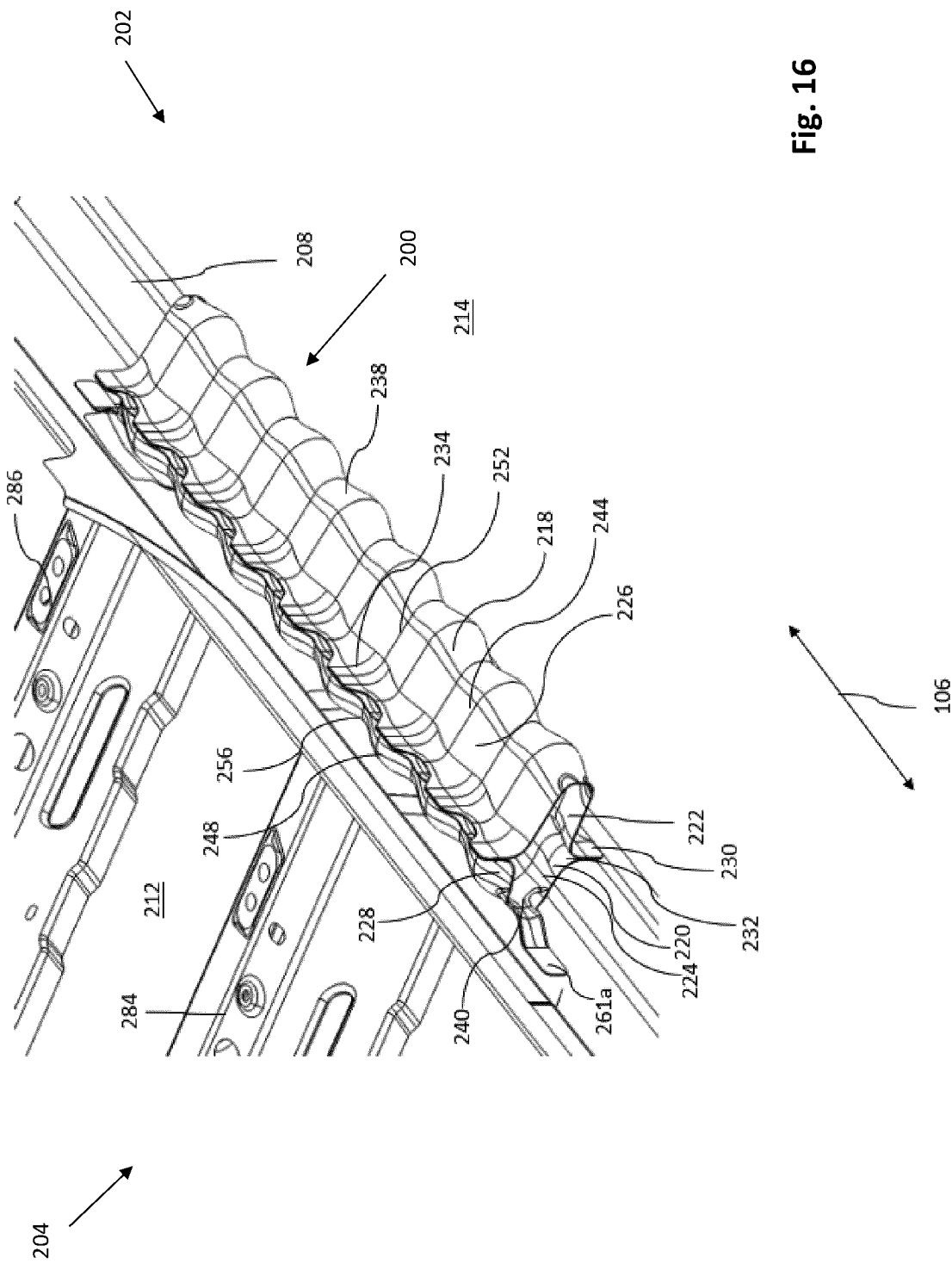
FIG. 16 is an enlargement of a portion of the vehicle structure of FIG. 15.

With reference to FIGS. 13 to 18, each foot 230, 232, 234, 236 may be configured in various ways. With reference to FIGS. 13 to 18, each foot 230, 232, 234, 236 may be a curved portion of the end of the respective leg 222, 224, 226, 228. However, the foot may also be a straight portion of the end of the respective leg 222, 224, 226, 228. With reference to FIGS. 13 and 14, the foot 230, 232, 234, 236 may form a wave shape including a plurality of flaps, but this is not necessary.

Figure 18:
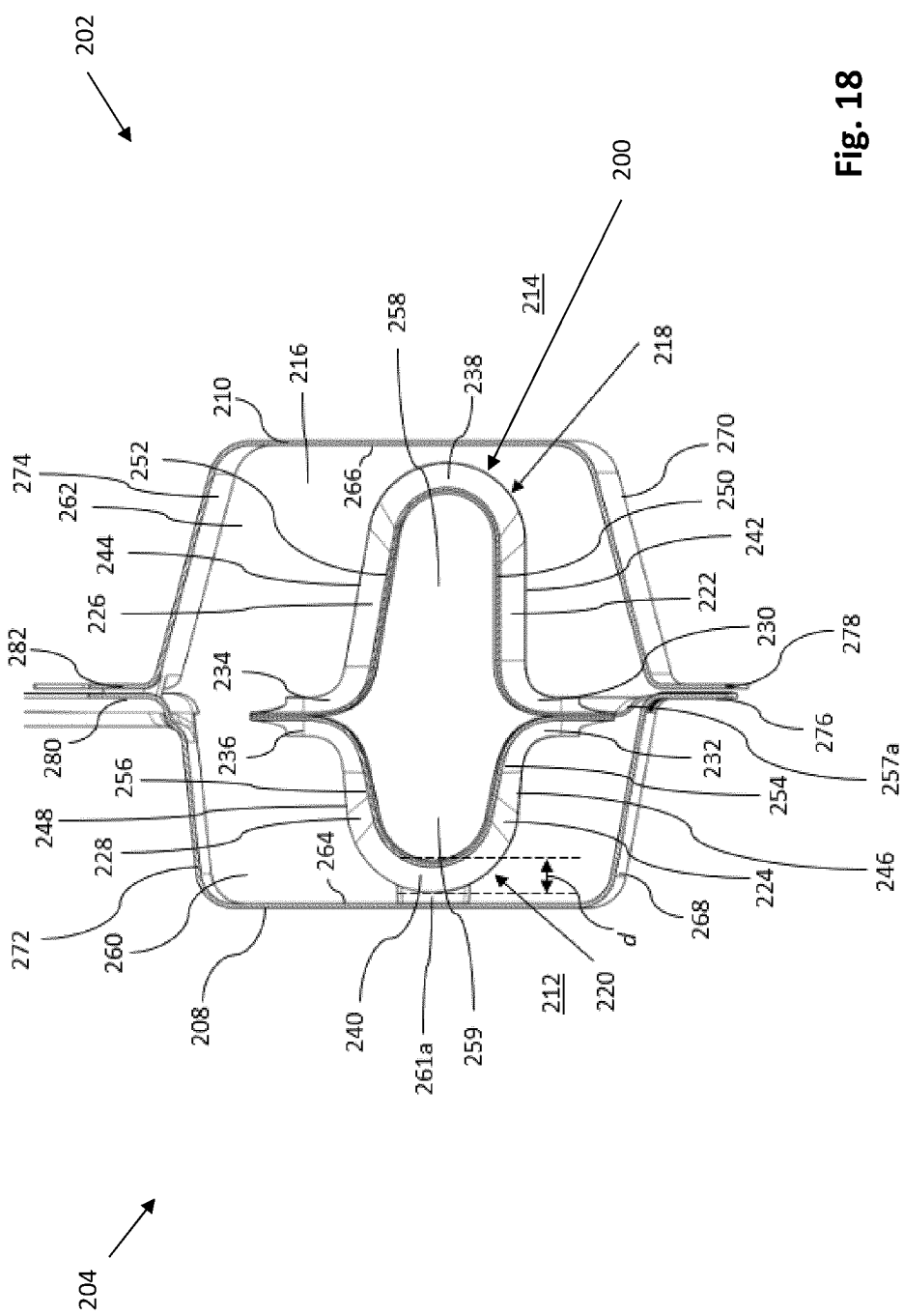
FIG. 18 is a cross-section of the assembled portion of the vehicle structure of FIG. 17.

With reference to FIG. 18, the feet 230, 234 of the first and second legs 222, 226 of the third reinforcement member 218 may be spaced apart from one another, such that an inner space 258 is formed between the first and second legs 222, 226 of the third reinforcement member 218. The feet 232, 236 of the first and second legs 224, 228 of the fourth reinforcement member 220 may be spaced apart from one another, such that an inner space 259 is formed between the first and second legs 224, 228 of the fourth reinforcement member 220. With reference to FIGS. 11 and 18, the inner space 258 formed between the first and second legs 222, 226 of the third reinforcement member 218 and the inner space 259 formed between the first and second legs 224, 228 of the fourth reinforcement member 220 may form the inner space 255 of the second tubular reinforcement member 200.

With reference to FIGS. 13 to 18, the first and second legs 222, 226 of the third reinforcement member 218 are joined in a third head section 238, which also may be called a third head portion. The first and second legs 224, 228 of the fourth reinforcement member 220 are joined in a fourth head section 240, which also may be called a fourth head portion. For some embodiments, the third head section 238 may be referred to as a first head section 238 while the fourth head section 240 may be referred to as a second head section 240. By "joined" with regard to each head section 238, 240 and the first and second legs 222, 224, 226, 228 is meant that the two legs 222, 224, 226, 228, i.e. the first and second legs 222, 224, 228, 228, are connected or attached to one another in the third or fourth head section 238, 240. The head section 238, 240 and the legs 222, 224, 226, 228 of each one 218, 220 of the third and fourth reinforcement members 218, 220 can be described as forming a U-shape with a foot 230, 232, 234, 236 at each end of the U-shape. Thus, each one 218, 220 of the third and fourth reinforcement members 218, 220 may have a U-shaped cross-section. However, other shapes are possible, for example a V-shaped cross-section. For some embodiments, it may be defined that the head section 238, 240 is located at ends of the first and second legs 222, 224, 226, 228 which are different from, or opposing, the ends of the first and second legs 222, 224, 226, 228 including or forming the feet 230, 232, 234, 236 of the first and second legs 222, 224, 226, 228.

With reference to FIGS. 13 to 18, each one 222, 224, 226, 228 of the first and second legs 222, 224, 226, 228 is corrugated in the longitudinal direction 106 to form a smooth wave shape and includes corrugations 242, 244, 246, 248, 250, 252, 254, 256. Each one 222, 224, 226, 228 of the first and second legs 222, 224, 226, 228 may be corrugated substantially along its entire longitudinal extension or length. The corrugations 242, 244, 246, 248, 250, 252, 254, 256 of the first and second legs 222, 224, 226, 228 of each one 218, 220 of the third and fourth reinforcement members 218, 220 include ridges 242, 244, 246, 248 and grooves 250, 252, 254, 256. Each one 222, 224, 226, 228 of the first and second legs 222, 224, 226, 228 may comprise a plurality of ridges 242, 244, 246, 248, for example five ridges 242, 244, 246, 248 or more, and a plurality of grooves 250, 252, 254, 256, for example five grooves 250, 252, 254, 256 or more. The ridges 242, 244 and grooves 250, 252 of the third reinforcement member 218 extend from the third head section 238 to the respective foot 230, 234 of the third reinforcement member 218. The ridges 246, 248 and grooves 254, 256 of the fourth reinforcement member 220 extend from the fourth head section 240 to the respective foot 232, 236 of the fourth reinforcement member 220. Thus, each one 222, 224, 226, 228 of the first and second legs 222, 224, 226, 228 may have a smooth wave shape.

With reference to FIGS. 13 to 18, the third reinforcement member 218 may be attached to the fourth reinforcement member 220. The foot 230 of the first leg 222 of the third reinforcement member 218 may be attached to the foot 232 of the first leg 224 of the fourth reinforcement member 220, for example by means of welding, an adhesive or a mechanical locking structure, such as rivets, or any other suitable fastening means etc. The foot 234 of the second leg 226 of the third reinforcement member 218 may be attached to the foot 236 of the second leg 228 of the fourth reinforcement member 220, for example by means of welding, an adhesive or a mechanical locking structure, such as rivets, or any other suitable fastening means etc. A foot 230, 234 may be attached to the opposing foot 232, 236 along its entire longitudinal length or extension in the longitudinal direction 106.

With reference to FIG. 18, as mentioned above, the third reinforcement member 218 may define an inner space 258 between the first and second legs 222, 226 of the third reinforcement member 218. The fourth head section 240 and the feet 232, 236 of the fourth reinforcement member 220 may be located outside the inner space 258 defined by the third reinforcement member 218. More specifically, in FIGS. 13 to 18, the entire fourth reinforcement member 220 may be located outside the inner space 258 defined by the third reinforcement member 218. With reference to FIG. 18, as mentioned above, the fourth reinforcement member 220 may define an inner space 259 between the first and second legs 224, 228 of the fourth reinforcement member 220. The entire third reinforcement member 218 may be located outside the inner space 259 defined by the fourth reinforcement member 220, which is the case in the embodiment of FIGS. 13 to 18.

With reference to FIGS. 13 to 18, the third reinforcement member 218 may have a plurality of attachment tongues 257a, 257b configured for attachment to a first and/or second member 208, 210 disclosed in more detail hereinbelow. The plurality of attachment tongues 257a, 257b of the third reinforcement member 218 may be provided at at least one of the feet 230, 234 of the third reinforcement member 218. The fourth reinforcement member 220 may have a first attachment tongue 261a at a first end and a second attachment tongue 261b at a second end for attachment to a first and/or second member 208, 210 disclosed in more detail hereinbelow. The first and second attachment tongues 261a, 261b of the fourth reinforcement member 220 may be provided at the fourth head section 240 of the fourth reinforcement member 220. In alternative embodiments, the fourth reinforcement member 220 may be provided with the attachment tongues 257a, 257b and/or the third reinforcement member 218 may be provide with the first and second attachment tongues 261a, 261b. The attachment tongues 257a, 257b, 261a, 261b may be integral with the respective one 218, 220 of the third and fourth reinforcement members 218, 220 (i.e. formed as a unit with the respective one 218, 220 of the third and fourth reinforcement member 218, 220) or attached to the respective one 218, 220 of the third and fourth reinforcement members 218, 220 for example by means of welding, an adhesive or a mechanical locking structure, such as rivets, or any other suitable fastening means etc.

With reference to FIGS. 13 to 18, the vehicle structure 202, to which the second tubular reinforcement member 200 and the first tubular reinforcement member 304; 704 may be applied, may include a portion 204 which extends in the longitudinal direction 106. The portion 104 may have a first member 208 which extends in the longitudinal direction 106. The portion 204 may have a second member 210 which extends in the longitudinal direction 106. The first member 208 is configured to face an inside 212 of a vehicle, for example a motor vehicle, such as a car. The second member 210 is configured to face an outside 214 of the same vehicle. The first and second members 208, 210 are attached to one another to form a substantially closed space 216, for example a closed space 216, between them. The first and second members 208, 210 may be attached to one another for example by means of welding, an adhesive or a mechanical locking structure, such as rivets, or any other suitable fastening means etc. Each of the first and second members 208, 210 may be formed from a plate, for example a metal plate, such as a plate of aluminium, which may be processed by press hardening. In the shown embodiment, each of the first and second members 208, 210 is, or comprises, a hat profile, but may in other embodiments instead be, or comprise, a U-profile, or could comprise any other suitable profile.

With reference to FIGS. 13 to 18, the third head section 238 of the third reinforcement member 218 may face one 208, 210 of the first and second members 208, 210 while the feet 230, 234 of the third reinforcement member 218 may face the other one 208, 210 of the first and second members 208, 210. With reference to FIG. 18, in the shown embodiment, the third head section 238 of the third reinforcement member 218 faces the second member 210 while the feet 230, 234 of the third reinforcement member 218 face the first member 208. However, it could be the other way around. The fourth head section 240 of the fourth reinforcement member 220 may face one 208, 210 of the first and second members 208, 210 while the feet 232, 236 of the fourth reinforcement member 220 may face the other one 208, 210 of the first and second members 208, 210. With reference to FIG. 18, in the shown embodiment, the fourth head section 240 of the fourth reinforcement member 220 faces the first member 208 while the feet 232, 236 of the fourth reinforcement member 220 face the second member 210. However, it could be the other way around. The fact that the third head section 238 faces one 208, 210 of the first and second members 208, 210 while the feet 230, 234 of the third reinforcement member 218 face the other one 208, 210 of the first and second members 208, 210 does not necessarily mean that there is an empty space between the third head section 238 or the feet 230, 234 and the first member 208 or the second member 210. Instead, there may be other members or units therebetween. The fact that the fourth head section 240 faces one 208, 210 of the first and second members 208, 210 while the feet 232, 236 of the fourth reinforcement member 220 face the other one 208, 210 of the first and second members 208, 210 does not necessarily mean that there is an empty space between the fourth head section 240 or the feet 232, 236 and the first member 208 or the second member 210. Instead, there may be other members or units therebetween.

With reference to FIG. 18, the third and fourth reinforcement members 218, 220 may be attached to at least one of the first and second members 208, 210. The fourth reinforcement members 220 may be indirectly attached to one of the first and second members 208, 210 via the third reinforcement member 218. Alternatively, the third reinforcement member 218 may be indirectly attached to one of the first and second members 208, 210 via the fourth reinforcement member 220. With reference to FIGS. 3 to 18, the third reinforcement member 218 may be attached to one of the first and second members 208, 210 by means of the plurality of attachment tongues 257a, 257b, wherein the fourth reinforcement member 220 may be directly attached to one of the first and second members 208, 210 by means of the first and second attachment tongues 261a, 261b.

With reference to FIG. 18, each of the first and second members 208, 210 may have a compartment 260, 262. Each compartment 260, 262 has a bottom surface 264, 266 and extends in the longitudinal direction 106. The first and second members 208, 210 may be attached to one another such that the compartments 260, 262 form the substantially closed space 216. The third head section 238 of the third reinforcement member 218 may be situated in one 260, 262 of the compartments 260, 262 while the fourth head section 240 of the fourth reinforcement member 220 may be situated in the other one 260, 262 of the compartments 260, 262. In the shown embodiment, the third head section 238 is located in the compartment 262 of the second member 210 while the fourth head section 240 is located in the compartment 260 of the first member 208.

Figure 17:
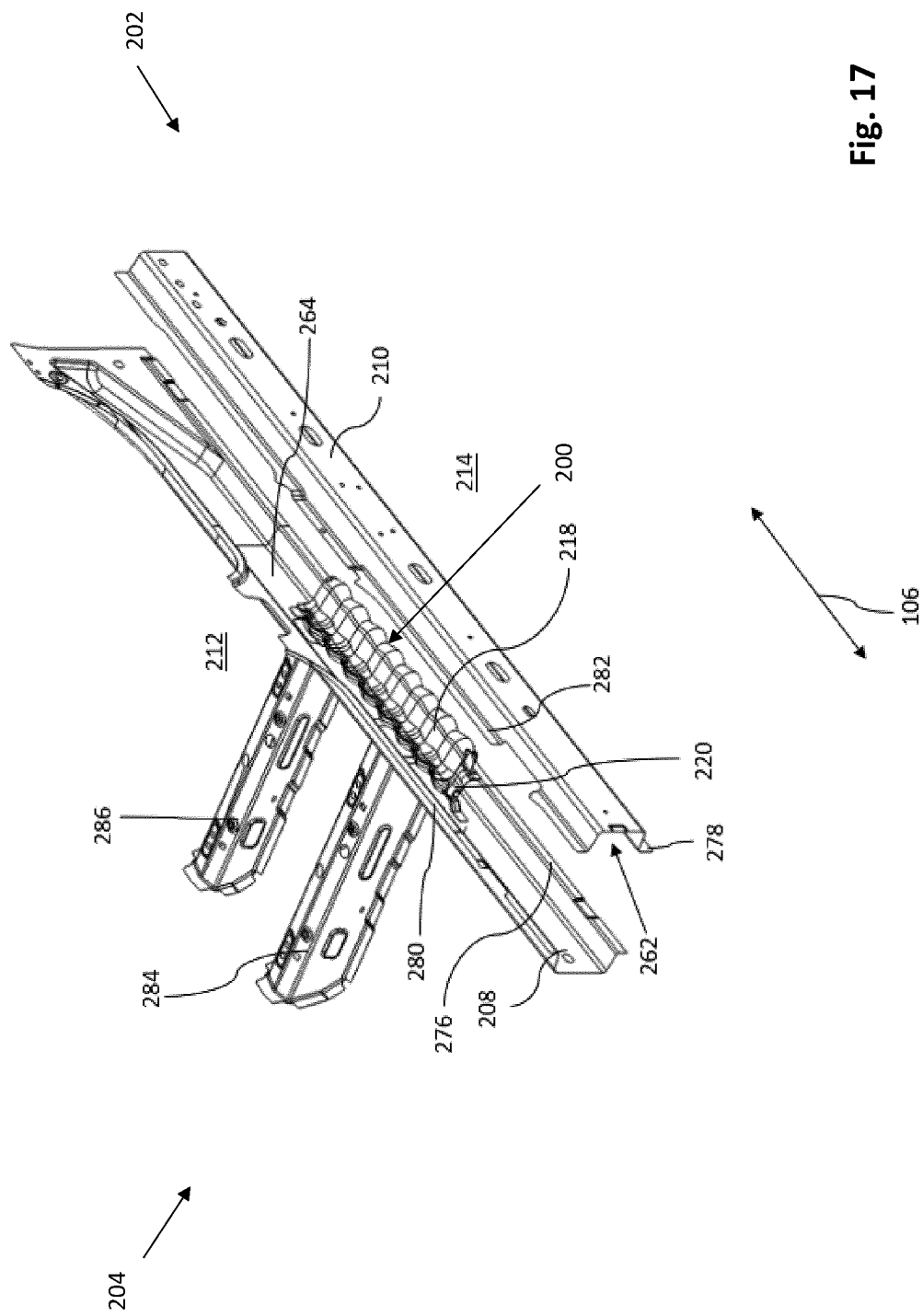
FIG. 17 is an exploded perspective view of the vehicle structure of FIG. 16.

With reference to FIGS. 17 and 18, each of the first and second members 208, 210 may have a first side wall 268, 270 and a second side wall 272, 274. Each of the first and second members 208, 210 may have a first flange 276, 278 attached to the first side wall 268, 270. Each of the first and second members 208, 210 may have a second flange 280, 282 attached to the second side wall 272, 274. The first and second members 208, 210 may be attached to one another via opposing flanges 276, 278, 280, 282 of the first and second flanges 276, 278, 280, 282, for example by means of welding, an adhesive or a mechanical locking structure, such as rivets, or any other suitable fastening means etc. The foot 230, 232, 234, 236 of at least one of the first and second legs 222, 224, 226, 228 of at least one of the third and fourth reinforcement members 218, 220, for example the third reinforcement member 218 in the shown embodiment, is attached to at least one 276, 278, 280, 282 of the first and second flanges 276, 278, 280, 282 via the plurality of attachment tongues 257a, 257b. Further, one of the third and fourth head sections 238, 240, for example the fourth head section 240 in the shown embodiment, may be attached to the bottom surface 264, 266 of one of the compartments 260, 262. More specifically, one of the third and fourth head sections 238, 240 may be attached to the bottom surface 264 of the compartment 260 of the first member 208. More specifically, the fourth head section 240 may be attached to the bottom surface 264 of the compartment 260 of the first member 208, for example by means of the first and second attachment tongues 261a, 261b. With reference to FIGS. 13 to 18, the assembly of the portion 204 can proceed by first attaching the third and fourth reinforcement members 218, 220 to one another and subsequently attaching them to one of the first and second members 208, 210, and then attaching the first and second members 208, 210 to one another. In alternative embodiments, the third head sections 238 may also be attached to one of the first and second members 208, 210, for example to the second member 210.

With reference to FIGS. 13 to 18, each ridge 242 of the first leg 222 of the third reinforcement member 218 may be aligned with one of the ridges 244 of the second leg 226 of the third reinforcement member 218. Hereby, it may be defined that there is a non-zigzag relationship between the ridges 242 of the first leg 222 and the ridges 244 of the second leg 226 of the same (third) reinforcement member 218.

With reference to FIGS. 13 to 18, each ridge 246 of the first leg 224 of the fourth reinforcement member 220 may be aligned with one of the ridges 248 of the second leg 228 of the fourth reinforcement member 220. Hereby, it may be defined that there is a non-zigzag relationship between the ridges 246 of the first leg 224 and the ridges 248 of the second leg 228 of the same (fourth) reinforcement member 220.

With reference to FIGS. 13 to 18, each groove 250 of the first leg 222 of the third reinforcement member 218 may be aligned with one of the grooves 252 of the second leg 226 of the third reinforcement member 218. Hereby, it may be defined that there is a non-zigzag relationship between the grooves 250 of the first leg 222 and the grooves 252 of the second leg 226 of the same (third) reinforcement member 218.

With reference to FIGS. 13 to 18, each groove 254 of the first leg 224 of the fourth reinforcement member 220 may be aligned with one of the grooves 256 of the second leg 228 of the fourth reinforcement member 220. Hereby, it may be defined that there is a non-zigzag relationship between the grooves 254 of the first leg 224 and the grooves 256 of the second leg 228 of the same (fourth) reinforcement member 220.

With reference to FIGS. 13 to 18, the third head section 238 may be corrugated, wherein the first and second legs 122, 126; 222, 226 of the third reinforcement member 218 and the third head section 238 may comprise the corrugations of the third reinforcement member 218, which include the ridges 242, 244 and grooves 250, 252 of the third reinforcement member 218. Each ridge 242, 244 of the third reinforcement member 218 may extend from the foot 230 of the first leg 222 of the third reinforcement member 218 to the foot 234 of the second leg 226 of the third reinforcement member 218 through the third head section 238. Each groove 250, 252 of the third reinforcement member 218 may extend from the foot 230 of the first leg 222 of the third reinforcement member 218 to the foot 234 of the second leg 226 of the third reinforcement member 218 through the third head section 238. It may be defined that the third head section 238 is non-flat.

With reference to FIGS. 13 to 18, the fourth head section 240 may be corrugated, wherein the first and second legs 224, 228 of the fourth reinforcement member 220 and the fourth head section 240 may comprise the corrugations of the fourth reinforcement member 220, which include the ridges 246, 248 and grooves 254, 256 of the fourth reinforcement member 220. Each ridge 246, 248 of the fourth reinforcement member 220 may extend from the foot 232 of the first leg 224 of the fourth reinforcement member 220 to the foot 236 of the second leg 228 of the fourth reinforcement member 220 through the fourth head section 240. Each groove 254, 256 of the fourth reinforcement member 220 may extend from the foot 232 of the first leg 224 of the fourth reinforcement member 220 to the foot 236 of the second leg 228 of the fourth reinforcement member 220 through the fourth head section 240. It may be defined that the fourth head section 240 is non-flat.

With reference to FIG. 18, in the shown embodiment, each ridge 246, 248 of the fourth reinforcement member 220 is more prominent in the fourth head section 240 than at the foot 232, 236 of the fourth reinforcement member 220. By "prominent" is meant that each ridge 246, 248 is bigger in the head section 240 than at the foot 232, 236. Further, in the embodiment illustrated in FIG. 18, each ridge 246, 248 of the fourth reinforcement member 220 gradually increases in size from the foot 232, 236 of the fourth reinforcement member 220 to the fourth head section 240. The wave shape of the fourth reinforcement member 220 forms a member thickness d of the fourth reinforcement member 220 when viewed in the longitudinal direction 106. In FIG. 18, the member thickness d in the fourth head section 240 of the fourth reinforcement member 220 is bigger than the member thickness d at the foot 232, 236 of the fourth reinforcement member 220. This is advantageous since the stress upon collision impacts may be greatest at the fourth head section 240 compared to at the foot 232, 236 of the fourth reinforcement member 220. However, in alternative embodiments, the fourth reinforcement member 220 may be provided without a varying member thickness d as illustrated in FIG. 18 and as disclosed and discussed above. In other alternative embodiments, each ridge 242, 244 of the third reinforcement member 218 may be more prominent in the third head section 238 than at the foot 230, 234 of the third reinforcement member 218. Further, in alternative embodiments, each ridge 242, 244 of the third reinforcement member 218 may gradually increase in size from the foot 230, 234 of the third reinforcement member 218 to the third head section 238.

With reference to FIGS. 13 to 18, the third reinforcement member 218 and the fourth reinforcement member 220 may be different in size. Hereby, the deformation behaviour of the vehicle structure for absorbing impacts and the rigidity and reinforcement of the vehicle structure can be further tailored and adapted to a specific application. In some embodiments, the head section 240 of the smaller reinforcement member 220 may face the first member 208. However, for some embodiments, the third reinforcement member 218 and the fourth reinforcement member 220 may be equal in size, for example as schematically illustrated in FIGS. 11 and 12.

Figure 19:
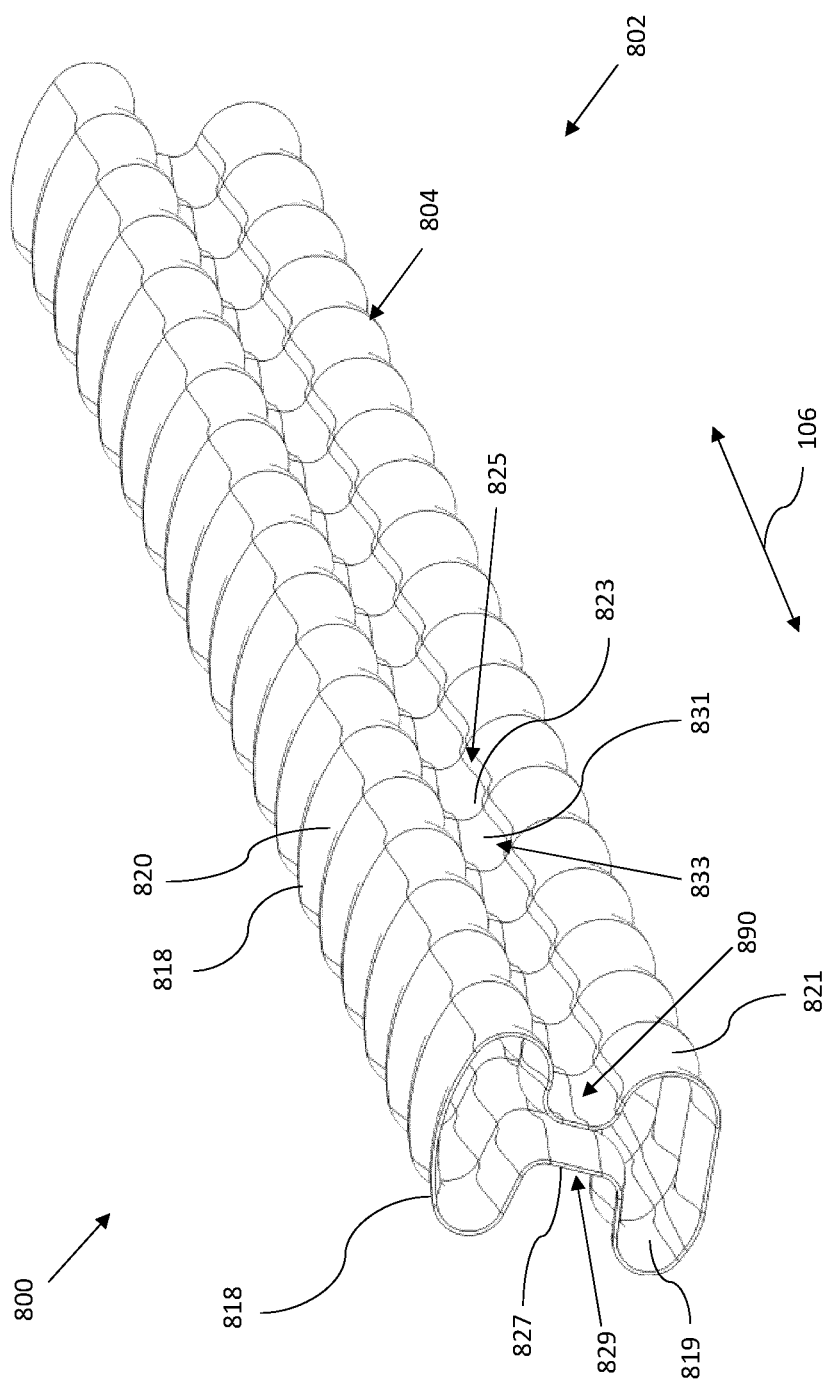
FIG. 19 is a schematic perspective view of a first tubular reinforcement member of another embodiment of the vehicle structure according to the present invention.
Figure 20:
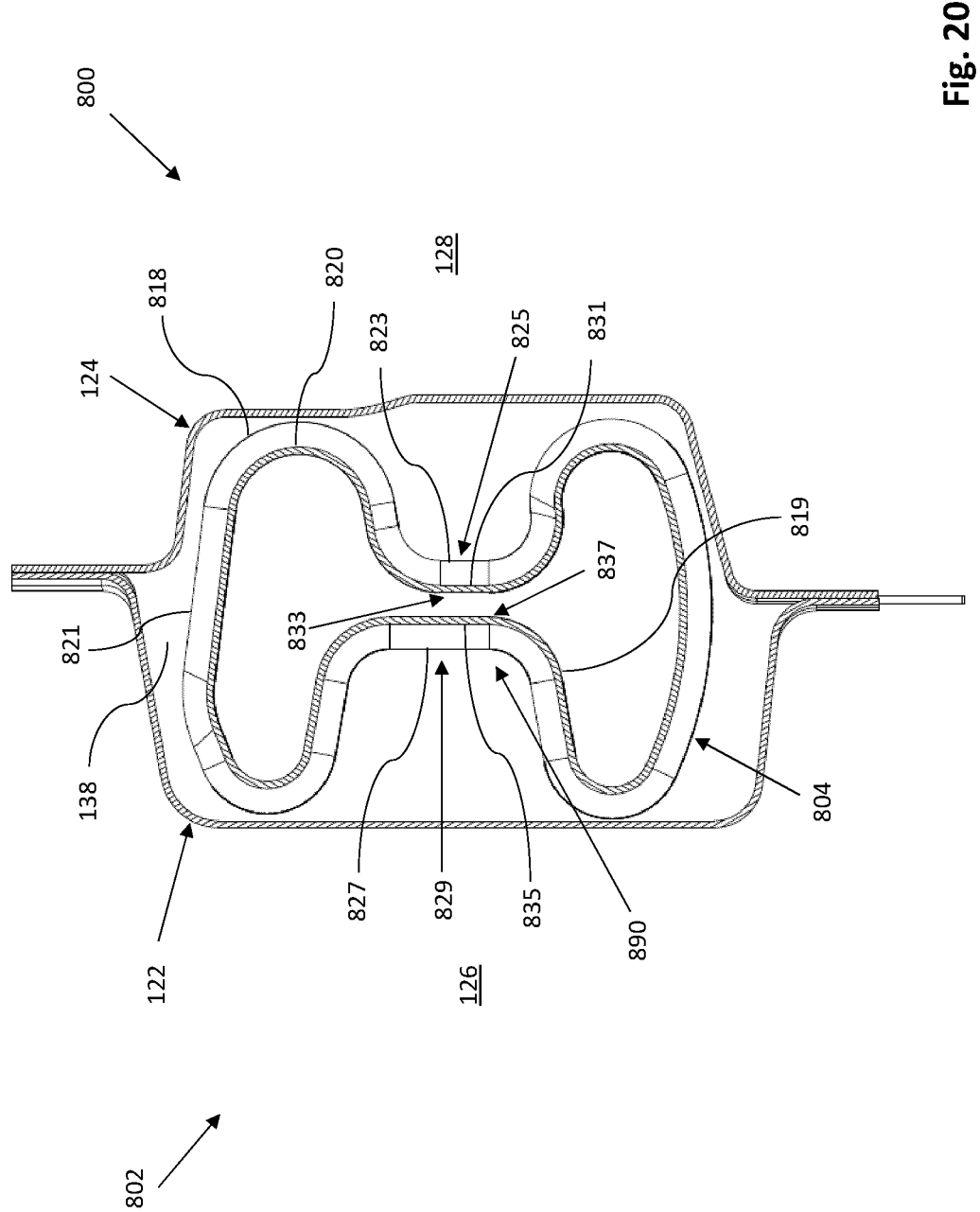
FIG. 20 is a schematic cross-section of the embodiment of FIG. 19.

With reference to FIGS. 19 and 20, a first tubular reinforcement member 804 of a portion 802 of another embodiment of the vehicle structure 800 according to the present invention is schematically illustrated. As mentioned above in connection with FIG. 1, the first tubular reinforcement member 804 has annular ridges 818 and annular grooves 820. The first tubular reinforcement member 804 has an inner surface 819 and an outer surface 821. At the outer surface 821 each of the annular ridges 818 has a recess 823 at a first location 825. The recesses 823 at the first locations 825 may be in alignment with one another in the longitudinal direction 106. At the outer surface 821 each of the annular ridges 818 may have a recess 827 at a second location 829. The second location 829 may be opposite to the first location 825, whereby a peanut-shaped, or bone-shaped, cross-section of the first tubular reinforcement member 804 may be provided. The recesses 827 at the second locations 829 may be in alignment with one another in the longitudinal direction 106.

With reference to FIGS. 19 and 20, for some embodiments, at the outer surface 821 each of the annular grooves 820 may have a recess 831 at a third location 833. The recesses 831 at the third location 833 may be in alignment with one another in the longitudinal direction 106. Further, for some embodiments, at the outer surface 821 each of the annular grooves 820 may have a recess 835 at a fourth location 837. The recesses 835 at the fourth location 837 may be in alignment with one another in the longitudinal direction 106. The third location 833 may be opposite to the fourth location 837.

With reference to FIGS. 19 and 20, for some embodiments, the recesses 823 of the annular ridges 818 at the first location 825 may be substantially in alignment with the recesses 831 of the annular grooves 820 at the third location 833 in the longitudinal direction 106. The recesses 827 of the annular ridges 818 at the second location 829 may be substantially in alignment with the recesses 835 of the annular grooves 820 at the fourth location 837 in the longitudinal direction 106.

With reference to FIGS. 19 and 20, for example, each recess 823, 827, 831, 835 may comprise, or be described as, a dent, a notch, or a depression. Otherwise, features of the first tubular reinforcement member 804 illustrated in FIGS. 19 and 20 may correspond to features of the first tubular reinforcement member 104, 304 shown in FIGS. 1 and 3 and are thus not repeated here. In alternative embodiments, at the outer surface 821 the first tubular reinforcement member 804 may be provided with recesses 823, 827, 831, 835 at only one, two or three of the following locations: the first location 825; the second location 829; the third location 833; and the fourth location 837.

With reference to FIGS. 19 and 20, the first tubular reinforcement member 804 may be described to have a waist 890, or a waist region.

Figure 21:
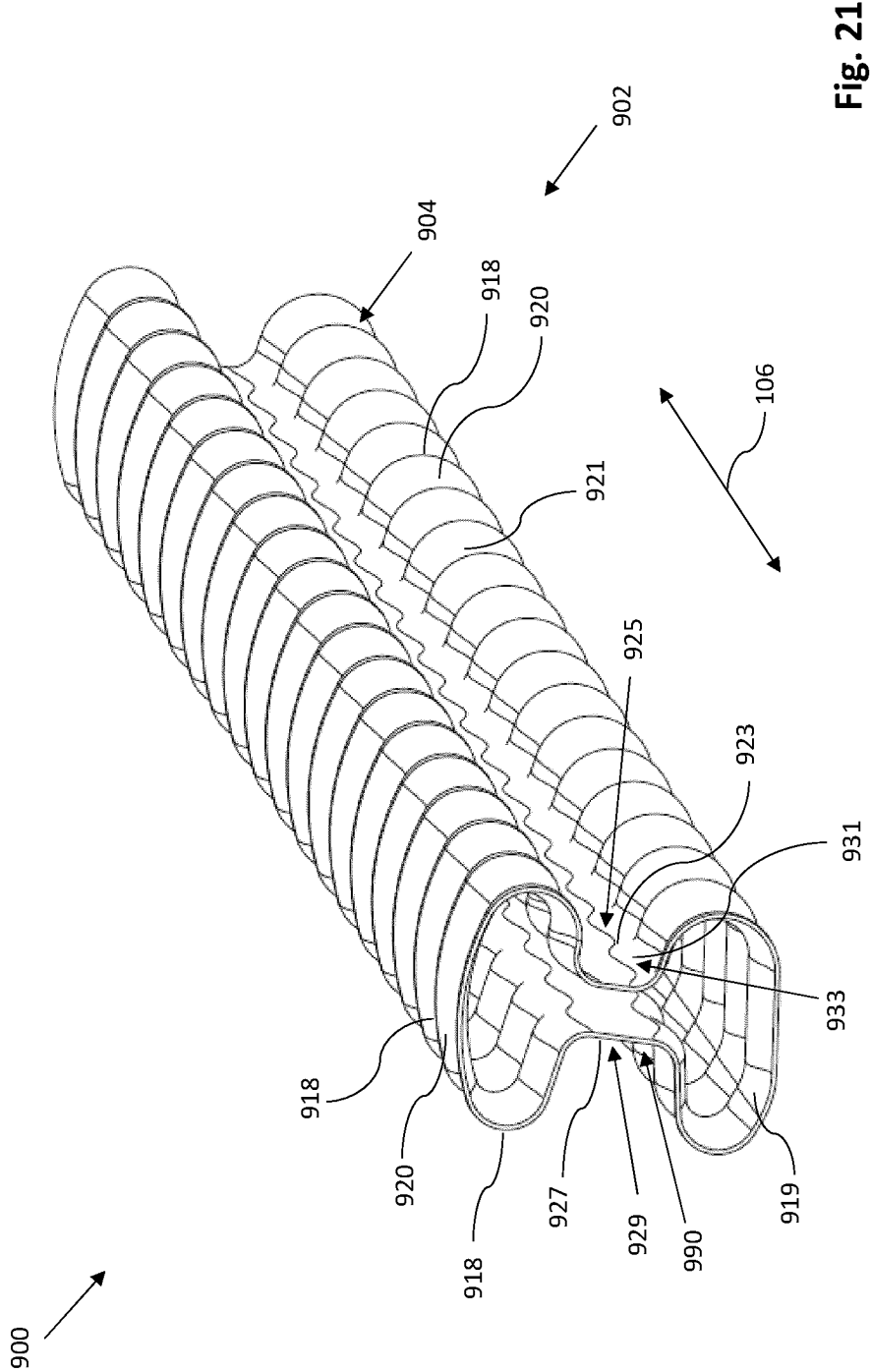
FIG. 21 is a schematic perspective view of a first tubular reinforcement member of an alternative version of the vehicle structure according to the present invention.
Figure 22:
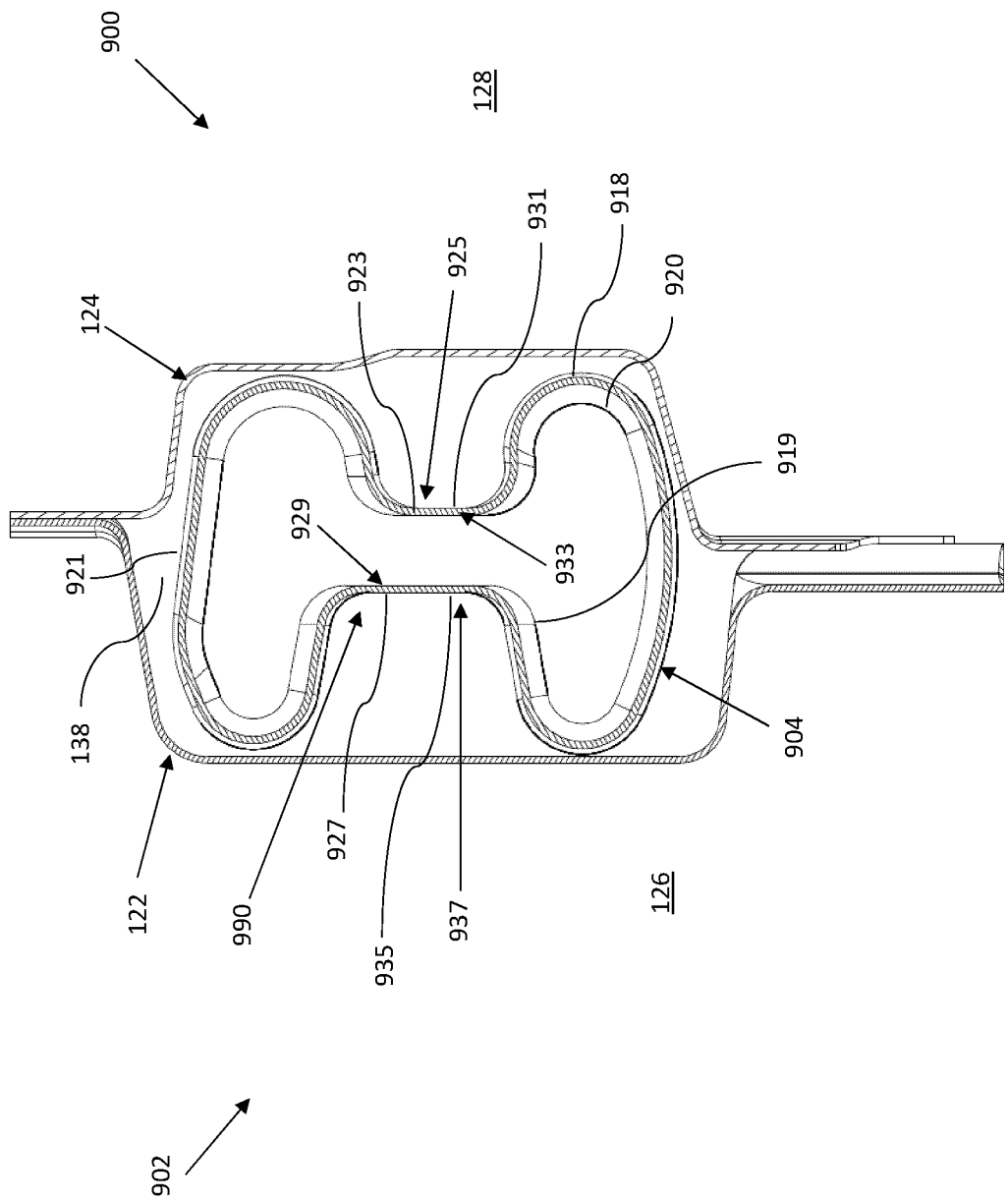
FIG. 22 is a schematic cross-section of the version of FIG. 21.

With reference to FIGS. 21 and 22, a first tubular reinforcement member 904 of a portion 902 of an alternative version of the vehicle structure 900 is schematically illustrated. Features of the first tubular reinforcement member 904 of FIGS. 21 and 22 may essentially correspond to features of the first tubular reinforcement member 804 of FIGS. 19 and 20. For example, the first tubular reinforcement member 904 of FIGS. 21 and 22 has ridges 918 and grooves 920, and the first tubular reinforcement member 904 has an inner surface 919 and an outer surface 921. The first tubular reinforcement member 904 of FIGS. 21 and 22 may comprise recesses 923, 927, 931, 935 at one, two, three and/or four locations of the group of: a first location 925; a second location 929; a third location 933; and a fourth location 937, essentially in a corresponding manner as for the first tubular reinforcement member 804 illustrated in FIGS. 19 and 20. However, at the waist 990, or in the waist region, the first tubular reinforcement member 904 of FIGS. 21 and 22 is free of, or has no, grooves 920 and ridges 918, i.e. there is no groove 920 or ridge 918 at the waist 990, or in the waist region, of the first tubular reinforcement member 904 of FIGS. 21 and 22. The waist 990, or the waist region, of the first tubular reinforcement member 904 may be described to be flat, for example in the longitudinal direction 106.

Each of the vehicle structures 100, 400, 500, 700, 800, 900 described above may be a vehicle side structure 100, 400, 500, 700, 800, 900 and the respective portion 102, 402, 502, 702, 802, 902 may be a side portion 102, 402, 502, 702, 802, 902. However, the vehicle structure 100, 400, 500, 700, 800, 900 may be applied and mounted elsewhere to the vehicle, for example in the front of the vehicle, and may there be part of a bumper, in the rear of the vehicle, or elsewhere within the vehicle. The vehicle structure 100, 400, 500, 700, 800, 900 may for example be used in an electric vehicle or a hybrid vehicle, but of course also in a regular vehicle with a combustion engine only. The vehicle structure 100, 400, 500, 700, 800, 900 may be configured to protect one or more electric batteries of an electric vehicle or a hybrid vehicle, for example upon a collision. Thus, the vehicle structure 100, 400, 500, 700, 800, 900 may be located at one or more sides of the electric battery. The vehicle structure 100, 400, 500, 700, 800, 900 is efficient in protecting the driver and/or one or more passengers of the vehicle upon a collision. The vehicle structure 100, 400, 500, 700, 800, 900 is efficient as a protection with regard to pole collisions or crashes. The vehicle structure 100, 400, 500, 700, 800, 900 is efficient in preventing the intrusion of a pole into the car upon a pole collision.

Each of the described portions 102, 402, 502, 702, 802, 902 is advantageously used as a side sill portion 102, 402, 502, 702, 802, 902. Thus, each of the disclosed embodiments of the portions 102, 402, 502, 702, 802, 902 may be a side sill portion 102, 402, 502, 702, 802, 902. The side sill portion 102, 402, 502, 702, 802, 902 is configured to extend in the longitudinal direction 106 of a vehicle body and is configured to be provided at a side of the vehicle body. Advantageously, the side sill portion 102, 402, 502, 702, 802, 902 is configured to be attached to one or more cross beams 162, 164, for example two cross beams 162, 164 of the vehicle body. However, in alternative embodiments, instead of a side sill portion, the portion or the side portion may be a side beam portion, a bumper portion, or a beam portion configured to be located elsewhere in a vehicle.

The features of the different embodiments of the vehicle structure disclosed above may be combined in various possible ways providing further advantageous embodiments.

The invention shall not be considered limited to the embodiments illustrated, but can be modified and altered in many ways by one skilled in the art without departing from the scope of the appended claims.

The invention claimed is:

1. A vehicle structure comprising a portion extending in a longitudinal direction, wherein the portion comprises
    a first member extending in the longitudinal direction, and
    a second member extending in the longitudinal direction,
    wherein the first member is configured to face an inside of a vehicle,
    wherein the second member is configured to face an outside of the vehicle,
    wherein the first and second members are attached to one another such that the first and second members form a closed space,
    wherein the portion comprises one or more first tubular reinforcement members located in the closed space, the first tubular reinforcement member having a longitudinal extension extending in the longitudinal direction,
    wherein the first tubular reinforcement member is corrugated and comprises corrugations,
    wherein the corrugations of the first tubular reinforcement member comprise annular ridges and annular grooves,
    wherein the portion comprises one or more second tubular reinforcement members located in the closed space,
    wherein the second tubular reinforcement member has a longitudinal extension extending in the longitudinal direction,
    wherein the second tubular reinforcement member is corrugated and comprises corrugations,
    wherein the second tubular reinforcement member forms an inner space, and
    wherein the first tubular reinforcement member is located in the inner space formed by the second tubular reinforcement member.

2. The vehicle structure according to claim 1, wherein each of the annular ridges extends transversely to the longitudinal direction, and wherein each of the annular grooves extends transversely to the longitudinal direction.

3. The vehicle structure according to claim 1, wherein the annular ridges and the annular grooves form the first tubular reinforcement member.

4. The vehicle structure according to claim 1, wherein the cross-section of the first tubular reinforcement member forms an oval ring.

5. The vehicle structure according to claim 1, wherein the cross-section of each of the annular ridges forms an oval ring, and wherein the cross-section of each of the annular grooves forms an oval ring.

6. The vehicle structure according to claim 1, wherein the cross-section of the first tubular reinforcement member forms an elliptic ring.

7. The vehicle structure according to claim 1, wherein the cross-section of each of the annular ridges forms an elliptic ring, and wherein the cross-section of each of the annular grooves forms an elliptic ring.

8. The vehicle structure according to claim 1, wherein the first tubular reinforcement member has an inner surface and an outer surface, and wherein at the outer surface each of the annular ridges has a recess at a first location.

9. The vehicle structure according to claim 8, wherein the recesses at the first locations are in alignment with one another in the longitudinal direction.

10. The vehicle structure according to claim 8, wherein at the outer surface each of the annular ridges has a recess at a second location.

11. The vehicle structure according to claim 10, wherein the second location is opposite to the first location.

12. The vehicle structure according to claim 10, wherein the recesses at the second locations are in alignment with one another in the longitudinal direction.

13. The vehicle structure according to claim 1, wherein the annular ridges and the annular grooves form a smooth wave shape extending along the longitudinal extension of the first tubular reinforcement member in the longitudinal direction.

14. The vehicle structure according to claim 1, wherein the first tubular reinforcement member is seamless.

15. The vehicle structure according to claim 1, wherein the longitudinal extension of the second tubular reinforcement member extends along the longitudinal extension of the first tubular reinforcement member.

16. The vehicle structure according to claim 1, wherein the second tubular reinforcement member encloses the first tubular reinforcement member.

17. The vehicle structure according to claim 1, wherein the corrugations of the second tubular reinforcement member comprise ridges and grooves, and
   wherein each ridge of the second tubular reinforcement member is in alignment with one of the annular ridges of the first tubular reinforcement member.

18. The vehicle structure according to claim 17, wherein each groove of the second tubular reinforcement member is in alignment with one of the annular grooves of the first tubular reinforcement member.

19. The vehicle structure according to claim 1, wherein one or more of the first and second tubular reinforcement members is/are formed from one or more plates.

* * * * *